United States Patent [19]
Sasaki et al.

[11] Patent Number: 5,657,305
[45] Date of Patent: Aug. 12, 1997

[54] OPTICAL INFORMATION RECORDING AND REPRODUCING APPARATUS INCLUDING A TOTAL REFLECTION SURFACE OR A LIGHT SHIELD PLATE DISPOSED BETWEEN A POLARIZED LIGHT SEPARATING SURFACE AND A DETECTION DEVICE FOR LIGHT BEAM COMPENSATION

[75] Inventors: Kenichi Sasaki, Yokohama; Koichiro Nishikawa, Takasaki, both of Japan

[73] Assignee: Canon Kabushiki Kaisha, Tokyo, Japan

[21] Appl. No.: 554,937

[22] Filed: Nov. 9, 1995

[30] Foreign Application Priority Data

Nov. 17, 1994 [JP] Japan .................. 6-283471
Oct. 30, 1995 [JP] Japan .................. 7-281654

[51] Int. Cl.[6] .................................. G11B 7/00
[52] U.S. Cl. .................. 369/110; 368/112; 368/107; 368/118
[58] Field of Search ................ 369/112, 110, 369/44.23, 44.12, 44.14, 44.41, 13, 107, 118

[56] References Cited

U.S. PATENT DOCUMENTS

| | | | |
|---|---|---|---|
| 4,730,297 | 3/1988 | Ishibashi et al. | 369/110 |
| 4,742,218 | 5/1988 | Nakamura et al. | 369/44.42 |
| 5,004,326 | 4/1991 | Sasaki | 369/110 |
| 5,036,504 | 7/1991 | Ono et al. | 369/44.12 |
| 5,072,437 | 12/1991 | Chikuma | 369/118 |
| 5,206,852 | 4/1993 | Kim et al. | 369/112 |
| 5,220,553 | 6/1993 | Ando et al. | 369/112 |
| 5,249,167 | 9/1993 | Seo | 369/44.14 |
| 5,249,171 | 9/1993 | Matsubayashi et al. | 369/110 |
| 5,307,335 | 4/1994 | Komiya | 369/112 |
| 5,331,622 | 7/1994 | Ernst et al. | 369/112 |
| 5,463,610 | 10/1995 | Nishikawa | 369/121 |
| 5,469,423 | 11/1995 | Shinoda et al. | 369/112 |

FOREIGN PATENT DOCUMENTS

| | | |
|---|---|---|
| 0339722 | 11/1989 | European Pat. Off. . |
| 0346844 | 12/1989 | European Pat. Off. . |
| 0469580 | 2/1992 | European Pat. Off. . |
| 0510283 | 10/1992 | European Pat. Off. . |
| 0545133 | 6/1993 | European Pat. Off. . |
| 0550036 | 7/1993 | European Pat. Off. . |
| 3604722 | 9/1986 | Germany . |
| 3913229 | 3/1990 | Germany . |
| 64-82349 | 3/1989 | Japan . |
| 5-234173 | 9/1993 | Japan . |

OTHER PUBLICATIONS

Patent Abstracts of Japan, JP 62-073444, vol. 11, No. 274, Sep. 19, 1987.

Patent Abstracts of Japan, JP 52-34173, vol. 17, No. 696, Dec. 20, 1993.

(List continued on next page.)

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An optical head for an opto-magnetic information recording and reproducing apparatus having stable characteristics. The optical head has a forward path optical system including a polarization beam splitter for reflecting a linearly-polarized light beam in the form of a divergent light beam from a light source, and an objective of a finite imaging system for converging the reflected light beam on an opto-magnetic recording medium, and a backward path optical system in which the reflected light beam from the recording medium is converged by the finite-imaging objective, and in which the converged light beam passes through the polarization beam splitter and is further reflected by a total reflection surface for reflecting this light beam to be led to detection means. A phase difference created in the convergent light beam when the light beam passes through a polarized light separating surface of the polarization beam splitter is compensated for by the total reflection surface.

36 Claims, 17 Drawing Sheets

OTHER PUBLICATIONS

Patent Abstracts of Japan, JP 4–149840, vol. 16, No. 436, Sep. 11, 1992.
Patent Abstracts of Japan, JP 60–252533, vol. 10, No. 127, May 1986.
Patent Abstracts of Japan, JP 62–173650, vol. 12, No. 19, Jan. 1988.
Patent Abstracts of Japan, JP 62–164236, vol. 13, No. 2, Jan. 1988.

INCIDENT ANGLE DEPENDENCY OF POLARIZED LIGHT TRANSMITTANCE/REFLECTANCE OF ORDINARY POLARIZATION BEAM SPLITTER FILM (DESIGNED FOR tp = 85%, rs = 100% AT INCIDENT ANGLE OF 45°)

○ ts

△ tp

INCIDENT ANGLE DEPENDENCY OF TRANSMITTANCE/
REFLECTANCE CHARACTERISTICS OF POLARIZED
LIGHT SEPARATING FILM

♦ Tp (TRANSMITTANCE OF DETECTED LIGHT
    KERR COMPONENT)

● Rs (FORWARD PATH REFLECTANCE,
    TRANSMITTANCE OF DETECTED LIGHT
    FRESNEL COMPONENT IN BACKWARD
    PATH : 18%)

FORWARD REFLECTED LIGHT WAVE FRONT ABERRATION IN INCIDENCE PLANE SECTION OF POLARIZATION BEAM SPLITTER FILM

INCIDENT ANGLE DEPENDENCY OF PHASE
CHARACTERISTICS WHEN DETECTED BEAM
PASSES POLARIZED LIGHT SEPARATING FILM

● P COMPONENT (PHASE OF KERR COMPONENT)
○ S COMPONENT (PHASE OF FRESNEL COMPONENT)

PHASE-INCIDENT ANGLE DEPENDENCY OF PHASE
DIFFERENCE COMPENSATION REFLECTING FILM
DESIGNED TO COMPENSATE FOR PHASE
DIFFERENCES DUE TO CHARACTERISTICS
SHOWN IN FIG. 6

THREE DESIGN EXAMPLES A, B, C

| | | |
|---|---|---|
| PHASE OF S-POLARIZED | ● | A |
| COMPONENT | ■ | B |
| (FRESNEL COMPONENT) | ◆ | C |
| | | |
| PHASE OF P-POLARIZED | ○ | A |
| COMPONENT | □ | B |
| (KERR COMPONENT) | △ | C |

SPECTRAL CHARACTERISTICS OF POLARIZED LIGHT SEPARATING FILM

FORWARD BEAM TO MEDIUM

S-POLARIZED LIGHT IN FORWARD BEAM POLARIZATION DIRECTION ; 5

OPTICAL INFORMATION RECORDING AND REPRODUCING APPARATUS INCLUDING A TOTAL REFLECTION SURFACE OR A LIGHT SHIELD PLATE DISPOSED BETWEEN A POLARIZED LIGHT SEPARATING SURFACE AND A DETECTION DEVICE FOR LIGHT BEAM COMPENSATION

BACKGROUND OF THE INVENTION

1. Field of the Invention

The present invention relates to an optical information recording and reproducing apparatus for recording information on an optical recording medium or reproducing information from the medium and, more particularly, to an opto-magnetic recording and reproducing apparatus using an opto-magnetic recording medium such as an opto-magnetic disk.

2. Description of the Related Art

Conventionally, an optical head for an optical information recording and reproducing apparatus using an opto-magnetic system is ordinarily arranged in such a manner that a light beam from a light source travels to a recording medium via a polarization beam splitter and a part of the light beam reflected by the medium diverges to travel to a photo-detector when the reflected light beam again passes through the polarization beam splitter.

In this arrangement, it is necessary for the polarization beam splitter to lead a maximum quantity of light to the medium in a forward optical path and to provide a maximum amount of a Kerr component in the divergent beam to the detector in a backward optical path. Ordinarily, in such a situation, the polarization beam splitter is disposed in a parallel beam. This is because the polarized light separating film of the polarization beam splitter ordinarily has an incident angle dependency in its characteristics. That is, the polarized light transmittance and reflectance and phase differences produced between polarized light components vary with respect to the angle of incidence of the light beam upon the polarized light separating film. There is a need to make these characteristics uniform in a cross section of the beam. Then, a need for disposing the polarization beam splitter in a parallel beam arises.

For the above-mentioned head for the opto-magnetic disk apparatus, therefore, an optical system must be formed in which a divergent beam from the light source is temporarily formed into a parallel beam by a collimator lens, and in which the parallel beam is thereafter converged on the recording medium by an objective. These two lenses, i.e., the objective and collimator lenses of the optical system, are indispensable if they are used to form an infinite imaging system.

These kinds of apparatuses are now being developed in keen competition with magnetic disk apparatuses, and it is necessary for them to be smaller in size and higher in speed. Conventionally, under the condition of forming an infinite imaging system, a separate optical head is formed by utilizing the characteristic of the objective being freely drivable relative to a parallel beam, i.e., separating moving parts which need to be moved so that the weight of a moving unit is smaller.

In this art, however, it is difficult to reduce the number of lenses, and the necessary positioning accuracy of a separated unit and a fixed unit becomes higher with advancement of miniaturization. Thus, the optical head cannot be remarkably miniaturized as long as the head system is based on this art.

If the condition that the polarization beam splitter is placed in a parallel beam can be eliminated, an optical magnetic head as small as optical heads of compact disk players in the number of parts and in size can be arranged by removing the collimator lens and by forming a finite imaging system by the objective lens. Also in such a case, there is a possibility that a light and high-speed apparatus will be realized which uses a very small optical system further miniaturized.

Even in the case of forming an infinite system, if only the polarization beam splitter can be placed in the divergent beam in front of the collimator lens, the objective and collimator lenses can be brought close to each other and the collimator lens can also serve as a lens for converging the detected beam split by the polarization beam splitter, which is necessary in the conventional art. Thus, means for miniaturization are increased if it is not necessary to place the polarization beam splitter in a parallel beam.

FIG. 1 shows a system disclosed in Japanese Patent Laid-Open Publication No. 234173/1993 as an example of an invention provided from such a view point. As shown in FIG. 1, a divergent light beam from a semiconductor laser device 1 passes through a polarization beam splitter 26 and is then changed into a parallel beam by a collimator lens 14. This parallel beam is converged on an opto-magnetic disk 6 by an objective 15. A detected light beam is reflected by the disk, passes through the objective and the collimator lens, and is reflected by the polarization beam splitter 26, thereby being deflected in a direction different from that of the light source. The detected light beam is again reflected by the next reflecting means 27 to reach photo-detectors 10 for opto-magnetic detection and servo detection by traveling through a ½ wavelength plate 8, a cylindrical lens 28 and a beam splitter 29.

The beam splitter 26 and the reflecting means 27 have films having substantially the same characteristics. The detected light beam is reflected by the beam splitter 26 to have a phase difference and is then reflected by the reflecting means 27 having the same characteristics so that the incident angles of rays incident upon the reflecting means 27 are in an inverted relationship with the incident angles of rays incident upon the beam splitter 26, thereby canceling the phase difference.

The above-mentioned Japanese Patent Laid-Open Publication No. 234173/1993 points out a problem that, if a polarization beam splitter having certain ideal transmittance and reflectance characteristics, e.g., Tp=85% and Rs=100%, is modified to reduce phase differences of p- and s-polarized light, the transmittance and reflectance characteristics deteriorate so that Tp=60% and Rs=70%. According to the art of this publication, the polarization beam splitter 26 is allowed to create phase differences of p- and s-polarized light in the detected light beam reflected by it, so that the ideal transmittance and reflectance characteristics of Tp=85% and Rs=100% are maintained. Then, the reflecting means 27 having substantially the same characteristics as the polarization beam splitter 26 is placed in the optical path of the detected light beam reflected by the polarization beam splitter 26 to cancel the phase differences of p- and s-polarized light created in the detected light beam.

[Problem 1]

In general, a phase difference created in a transmitted or reflected light beam by a polarization beam splitter has an incident angle dependency due to the fact that the polarized light separating film is ordinarily a laminated film of a dielectric having characteristics determined according to the relationship between the refractive indexes, the thicknesses of layers of the film and the wavelength of the incident light beam. Ordinarily, each layer of the dielectric multilayer film is formed so as to satisfy the condition that its thickness is uniform within the range of manufacturing error in an effective diametrical area.

For example, if a ray is incident upon the film at a certain incident angle and travels in the film at a refractive angle θ, the film designed to realize a certain characteristic is formed, to put it simply, by setting its thickness to the desired value with respect to the ray traveling at the refractive angle θ, i.e., a value obtained by multiplying the desired distance for the ray by cosθ. Accordingly, if the incident light beam has an incident angle constant in the entire beam area (that is, in the case of a parallel beam), a phase difference is created uniformly through the light beam area. However, with respect to a ray incident at an angle different from the predetermined incident angle, the effective film thickness is changed according to the incident angle of the ray. As a result, the overall characteristics of the polarized light separating film differ from the desired characteristics.

In the above-described example of the conventional art, the divergent light beam in the forward optical path from the light source to the medium via the polarization beam splitter also undergoes phase modulation of the film of the polarization beam splitter. Ordinarily, in this kind of apparatus, the light source is a semiconductor laser device, the light beam in the forward optical path has only a linearly-polarized component, and the polarization beam splitter receives only a p-polarized component. As mentioned above, the phase modulation effect on rays depends on the incident angle and is not uniform in a cross section of the light beam. Even if the light beam has only a p-polarized component, it has local phase advancement and lag according to the incident angle. That is, such phase modulation causes a wavefront aberration of the light beam in the forward path.

Therefore, while a phase difference can be allowed as a reflection phase difference of the detected light beam reflected by the polarization beam splitter, it is necessary to reduce the incident angle dependency of phase variation with respect to the p-polarized component of the transmitted light beam passing through the polarization beam splitter.

The first problem to be solved by the present invention is summarized below. While importance has been set on canceling or reducing a phase difference created in the detected light beam, it is necessary to recognize the influence of the phase characteristics of the film upon the light beam in the forward path causing a wavefront aberration. To reduce this aberration, it is necessary to reduce the incident angle dependency of the phase through the film in the forward optical path.

[Problem 2]

The transmittance and reflectance also have incident angle dependencies for the same reason as in the above, and these dependencies must be considered. To maintain a high efficiency of utilization of the quantity of light from the light source, it is necessary to realize characteristics of the polarization beam splitter, e.g., Tp=85% and Rs=100%, as stated in the specification of the above-described example of the conventional art. These characteristics must be achieved with respect to the incident angle of all rays in the convergent light bream. The specification of the conventional art includes a description of the effect that, if the beam splitter is designed to reduce the phase difference, the transmittance and reflectance characteristics change so that the utilization efficiency is reduced, but it includes no description of the incident angle dependency of the transmittance and reflectance.

If the film of the polarization beam splitter is simply designed to set the desired transmittance and reflectance with respect to a principal ray without particularly considering the incident angle dependency, then certain distributions of the transmittance and reflectance occur in a direction along the incidence surface of the polarization beam splitter film. For example, in a case where a principal ray is incident on the film at 45°, the transmittance and reflectance are non-uniform from a point at which a marginal ray is incident at an angle of 45°+α to an opposite point of an incident angle of 45°−α, and may have asymmetric distributions such as those shown in FIG. 2. In such a case, the quantity of light incident upon the objective in the forward optical path has an asymmetric distribution about the optical axis, so that the light spot on the medium is also asymmetric.

Another case is possible in which the transmittance has a distribution such as to be lower with respect to marginal rays at opposite points of 45°±α. In this case, the diameter of a substantial area of the light beam in the corresponding cross section is smaller, that is, the effective numerical aperture (NA) is smaller and the light spot is larger.

Thus, the light spot on the recording medium is influenced to cause a hindrance to recording and reproduction. Therefore, it is particularly important to maintain certain degrees of symmetry and uniformity of the quantity of light in the forward optical path. However, if the film is designed so that the transmittance of the p-polarized component is uniform at an intermediate value of about 85% without an angle dependency, the problem of an increase in the total number of film layers and other problems are encountered.

Further, a loss in the quantity of light is also caused by the influence of an asymmetry of the reflectance due to an incident angle dependency when the detected light beam reflected by the recording medium and returned to the polarization beam splitter is reflected by the polarization beam splitter, although this influence is not as serious as that of the forward optical path.

The second problem to be solved by the present invention is summarized below. It is necessary to recognize that the angle dependency of the polarized light separating transmission and reflection characteristics of the polarization beam splitter largely affects the shape of the detection spot on the recording medium and the loss in the quantity of light of the detected light beam and, therefore, to limit the incident angle dependency of the polarized light separating transmission and reflection characteristics of the film.

[Problem 3]

When the light beam reaches the reflecting means 27 of the conventional art, further 85% of the p-polarized component of the light beam passes through the reflecting means 27 because the films of the polarization beam splitter 26 and the reflecting means 27 in the conventional art have essentially the same characteristics. Therefore, the absolute value of the quantity of light reaching the detectors 10 is not large enough to ensure the desired detection performance against noise. Only 2.25% of the p-polarized component of the detected light beam can reach the detectors 10.

Also, it is necessary for the films having the same characteristics to have the same glass-film structure. Therefore, the reflecting means 27 must be backed by the same film-sandwiching as that for the beam splitter 26.

The third problem to be solved by the present invention is summarized below. In the conventional art, unnecessary transmission occurs due to the polarized light separating transmission and reflection characteristics of the reflecting means 27 to influence the loss in the quantity of light of the detected light beam. It is necessary to recognize that the angle dependency of the polarized light separating transmission and reflection characteristics of the reflecting means 27 also influences the loss in the quantity of peripheral light. To reduce this influence, it is necessary to optimize the polarized light separating transmission and reflection characteristics of the film and the incident angle dependency of the same. Further, to form the reflecting means 27 so that its characteristics are equal to those of the polarization beam splitter 26, additional manufacturing steps for providing a film-sandwiching glass part and attaching the glass part to the back surface of the film are required.

SUMMARY OF THE INVENTION

The present invention aims to realize further stabilized characteristics of a finite imaging system in an optical head used in an opto-magnetic recording and reproducing apparatus.

More particularly, an object of the present invention is to provide an optical information recording and reproducing apparatus in which transmission and reflection characteristics are uniform through the entire effective diametrical area of a light beam in a forward optical path, and in which a serious influence upon the shape of a spot on a recording medium can be prevented.

Another object of the present invention is to provide an optical information recording and reproducing apparatus in which substantially no aberration occurs in a light beam in a forward optical path due to characteristics of films.

Yet another object of the present invention is to provide an optical information recording and reproducing apparatus in which a large quantity of light reaching a detector can be maintained through the entire effective diametrical area of a detected light beam, whereby the influence of noise can be reduced.

Still another object of the present invention is to provide an optical information recording and reproducing apparatus in which a phase compensating surface is provided as a back reflecting surface, which can be formed only by attaching a film without a glass backing.

A further object of the present invention is to provide an optical information recording and reproducing apparatus in which the influence of a phase difference can be eliminated by cutting the phase difference without compensating for the same, and in which a cross-talk from adjacent tracks can be simultaneously eliminated.

Accordingly, still a further object of the present invention is to provide an optical information recording and reproducing apparatus which can be arranged to reduce the track pitch of a recording disk as well as to improve the head optical system, and in which the tilt allowance range can be increased advantageously.

The present invention provides, as means for achieving the above-described objects, an optical information recording and reproducing apparatus comprising a forward path optical system including a polarization beam splitter for reflecting a linearly-polarized light beam in the form of a divergent light beam from a light source for producing a light beam for recording or reproducing information, and an objective of a finite imaging system for converging the reflected light beam on an opto-magnetic recording medium, and a backward path optical system in which the reflected light beam from the recording medium is converged by the finite-imaging objective, and in which the converged light beam passes through the polarization beam splitter and is further reflected by a total reflection surface for reflecting this light beam to be led to detection means. A phase difference created in the convergent light beam when the light beam passes through a polarized light separating surface of the polarization beam splitter is compensated for by the total reflection surface.

According to the above-described means of the present invention, the problem of a wavefront aberration caused in the light beam in the forward optical path when the light beam passes through the polarized light separating film and the problem of the angle dependency of the transmittance and reflectance characteristics of the polarized light separating film, that were difficult to solve in the conventional forward optical path arrangement shown in FIG. 2, can be solved by setting a forward reflecting path and a backward transmission path as optical paths through the polarization beam splitter while the number of film layers is limited.

The above-mentioned total reflection surface is a back reflecting surface formed integrally with the polarization beam splitter by a dielectric multilayer film.

The above-described means of the present invention uses a back reflecting film and is, therefore, essentially free from the problem of the angle dependency of the reflectance. A reflectance of approximately 100% as a reflectance of total reflection can easily be achieved thereby, so that the loss in the quantity of light of the detected light beam can be limited to improve noise proofing. Also, a design optimized for a desirable phase difference characteristic is possible while the number of film layers is limited. Further, there is no need for attaching a glass member to the back surface, so that the number of parts and the number of manufacturing steps can be reduced.

Specifically, a vitreous material forming the polarization beam splitter and the back reflecting surface has a refractive index of 1.7 or more at operating wavelengths.

According to the above-described means of the present invention, the inclination of rays in the glass can be reduced if the glass is selected from those having a high refractive index. Accordingly, it is possible to narrow the range in which the angle dependency of the film with respect to marginal rays must be considered. A burden on the film design can be reduced thereby.

Specifically, the object-side NA of the finite-imaging objective is 0.19 or less.

According to the above-described means of the present invention, the object-side NA determines the angular range of marginal rays, and the range in which the angle dependency of the film with respect to marginal rays must be considered can be reduced by limiting the angular range within predetermined limits, thereby reducing a burden on the film design.

The present invention provides, as means for achieving the above-described objects, another optical information recording and reproducing apparatus comprising a forward path optical system including a polarization beam splitter for reflecting a linearly-polarized light beam in the form of a divergent light beam from a light source for producing a light beam for recording or reproducing information, a collimator lens for changing the reflected light beam into a parallel beam, and an objective for converging the parallel beam to irradiate an opto-magnetic recording medium, and a backward path optical system in which the reflected light beam from the opto-magnetic recording medium again passes the collimator lens to be changed into a convergent beam after passing through the objective, and this convergent light beam passes through the polarization beam splitter and is further reflected by a total reflection surface for reflecting this light beam to be led to detection means. A phase difference created in the convergent light beam when the light beam passes through a polarized light separating surface of the polarization beam splitter is compensated for by the total reflection surface.

According to the above-described means of the present invention, a parallel light beam is formed in the optical path between the collimator lens and the objective lens, so that the size of a fixed head unit can be reduced if a separated optical system arrangement, for example, is adopted.

The present invention provides, as means for achieving the above-described objects, still another optical information recording and reproducing apparatus comprising a forward path optical system including a polarization beam splitter for reflecting a linearly-polarized light beam in the form of a divergent light beam from a light source for producing a light beam for recording or reproducing information, and an objective of a finite imaging system for converging the reflected divergent light beam on an opto-magnetic recording medium, and a backward path optical system in which the reflected light beam from the recording medium is converged by the finite-imaging objective, the converged light beam then passes through the polarization beam splitter, and rays in an end portion of the light source in a range of an effective light beam diameter are thereafter cut off by a light shield plate, the light beam thereafter being led to detection means.

According to the above-described means of the present invention, rays in a portion of the light beam largely influenced by a phase difference created by the polarized light separating film of the polarization beam splitter are cut off to eliminate the influence of the phase difference. Simultaneously, cross-talk components from tracks on the medium adjacent to a track presently tracked by the light beam can be eliminated.

The present invention provides, as means for achieving the above-described objects, a further optical information recording and reproducing apparatus comprising a forward path optical system including a polarization beam splitter for reflecting a linearly-polarized light beam in the form of a divergent light beam from a light source for producing a light beam for recording or reproducing information, a collimator lens for changing the reflected light beam into a parallel beam, and an objective for converging the parallel beam on an opto-magnetic recording medium, and a backward path optical system in which the reflected light beam from the opto-magnetic recording medium again passes the collimator lens to be changed into a convergent beam after passing through the objective, the converged light beam then passes through the polarization beam splitter, and rays in an end portion of the light source in a range of an effective light beam diameter are thereafter cut off by a light shield plate, the light beam thereafter being led to detection means.

According to the above-described means of the present invention, rays in a portion of the light beam largely influenced by a phase difference are cut off to eliminate the influence of the phase difference. Simultaneously, cross-talk components from tracks on the medium adjacent to a track presently tracked by the light beam can be eliminated.

The above-mentioned light shield plate cuts off opposite end portions of the converged light beam in the range of the effective light beam diameter corresponding to the direction of a plane of incidence on the polarization beam splitter.

The angle of incidence of marginal rays on the polarized light separating film of the polarization beam splitter is largely different from the incident angle of the principal ray in the direction along the above-mentioned plane of incidence. Accordingly, opposite end portions of the light beam in the direction along the plane of incidence on the polarized light separating film are influenced most greatly by the phase difference due to the change in incident angle. According to the above-described means of the present invention, therefore, these portions are cut off to effectively eliminate the influence of the phase difference.

Specifically, the above-mentioned light shield plate cuts off opposite end portions of the converged light beam in the range of the effective light beam diameter which are greatly influenced by a phase difference created by passage through the polarization beam splitter.

According to the above-described means of the present invention, only a portion of the light beam largely influenced by a phase difference, i.e., a portion having a considerable influence on signal quality, e.g., attenuation of the reproduced signal amplitude of an opto-magnetic signal, is selectively removed to enable only a portion essentially free from the influence of the phase difference to be detected. Therefore, the apparatus of the invention can reproduce a signal with improved reliability in comparison with the conventional apparatus not separating such light beam portions.

Specifically, the end portion of the light beam cut off by the light shield plate includes a portion facing in a direction toward a track on the optical recording medium which is adjacent to a track presently tracked by the light beam.

Information written in a track adjacent to a track on the recording medium from which the necessary information is being presently read out can leak to a portion of the detected light beam facing the adjacent track. According to the above-described means of the present invention, such a portion of the light beam is cut off to effectively eliminate the influence of the adjacent track.

Also, specifically, the above-mentioned light shield plate cuts off opposite end portions of the converged light beam in the range of the effective light beam diameter which contain a large amount of cross-talk components from tracks on the optical recording medium adjacent to a track presently tracked by the light beam.

According to the above-described means of the present invention, only a portion of the light beam containing a large amount of cross-talk signal components from an adjacent track is selectively removed to enable only a portion having a smaller amount of cross-talk signal components to be detected. Therefore, the apparatus of the invention can reproduce a signal with improved reliability in comparison with the conventional apparatus not separating such light beam portions.

Specifically, the above-mentioned polarization beam splitter reflects linearly-polarized light from the light source by a substantially constant reflectance.

The above-described means of the present invention prevents a reduction in the quantity of light in a peripheral portion of the forward path light beam incident on the objective due to passage through the polarized light separating film, and also prevent an asymmetric light quantity distribution with respect to the principal ray. It is therefore possible to form an ideal reproducing light spot on the recording medium without forming an excessively large spot or an asymmetric spot.

Specifically, the detected light beam from the recording medium can pass through the polarization beam splitter at a substantially uniform transmittance along any plane of polarization.

According to the above-described means of the present invention, the effective quantity of detected light can be fully utilized without wastefully cutting it.

These and other objects, features and advantages of the present invention will become apparent from the following detailed description of the preferred embodiments of the invention in conjunction with the accompanying drawings.

DESCRIPTION OF THE PREFERRED EMBODIMENTS

Figure 1:
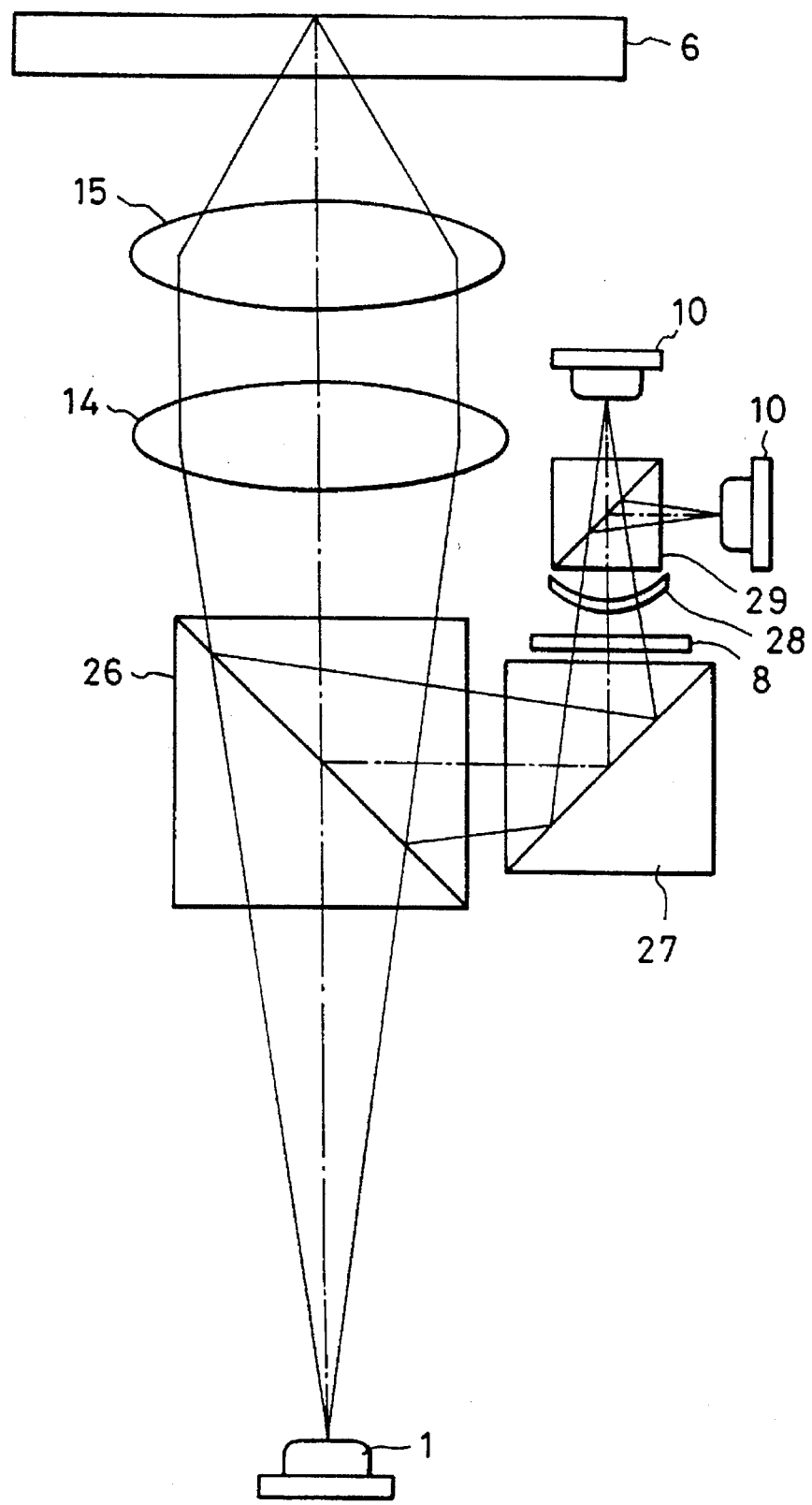
FIG. 1 is a schematic diagram of the configuration of an optical head used in a conventional opto-magnetic recording and reproducing apparatus.
Figure 2:
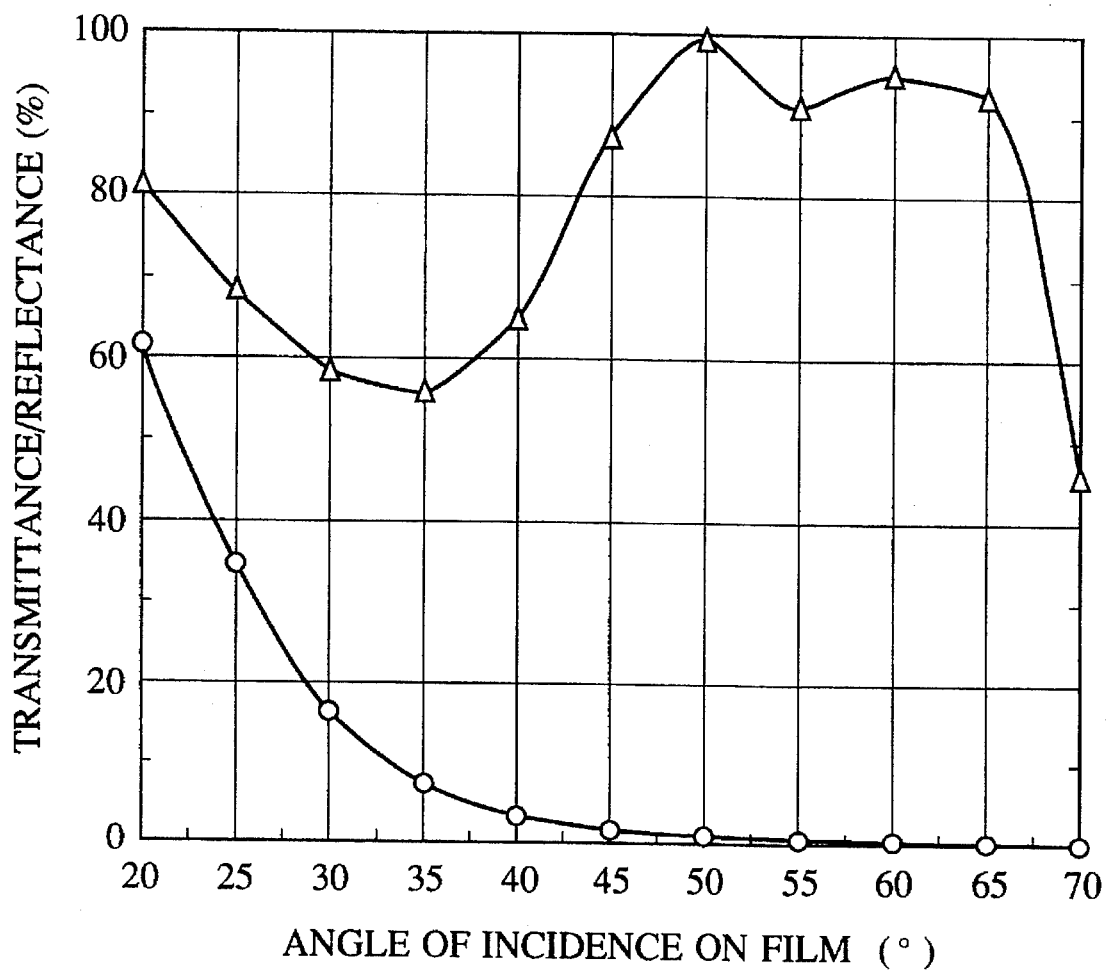
FIG. 2 is a graph showing an incident angle dependency of each of the transmittance and reflectance of the conventional polarized light separating film.
Figure 3:
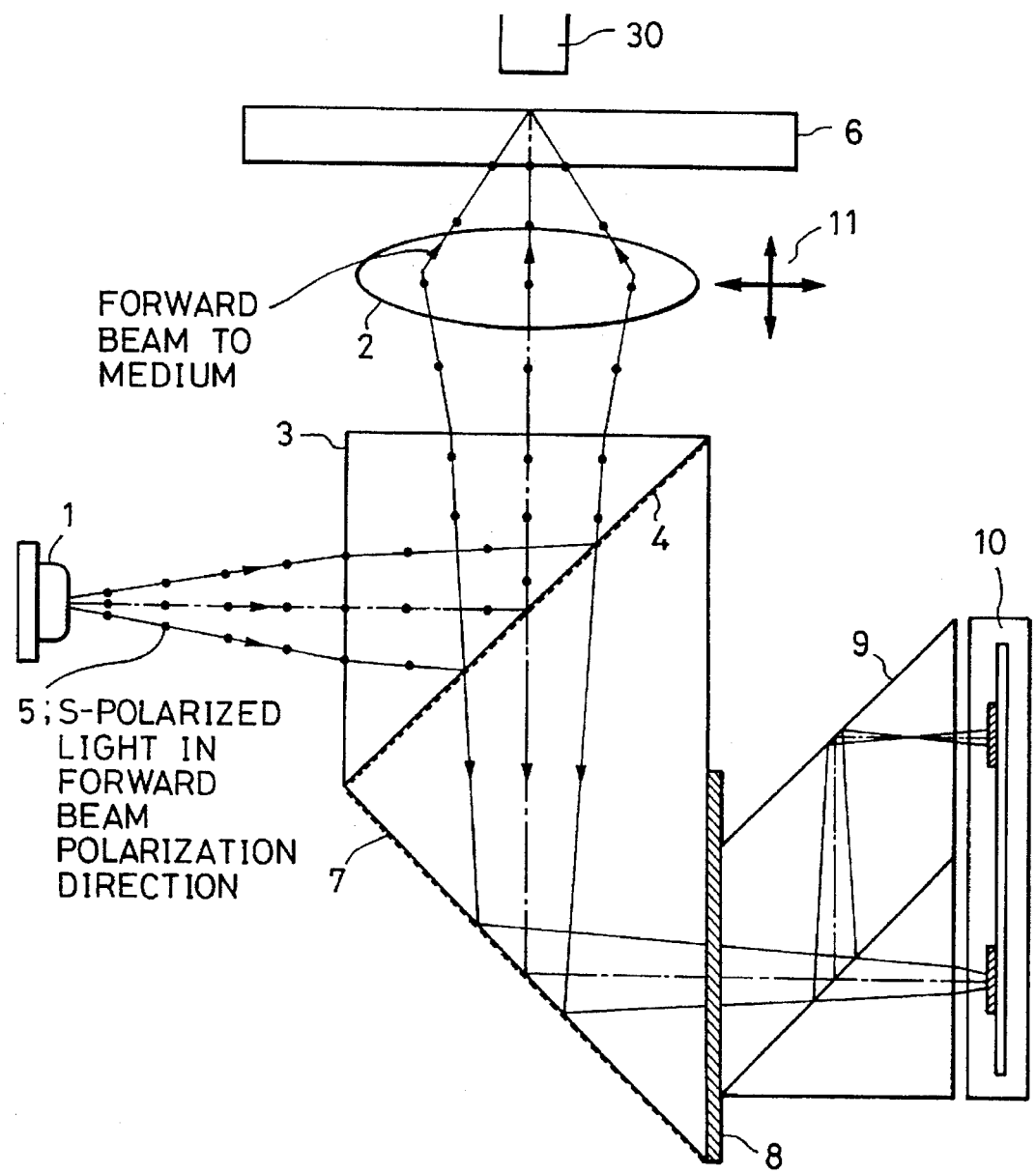
FIG. 3 is a schematic diagram of the configuration of an optical head for an opto-magnetic recording and reproducing apparatus in accordance with a first embodiment of the present invention.

An optical head system for an opto-magnetic recording and reproducing apparatus in accordance with a first embodiment of the present invention will be described with reference to FIG. 3.

A magnetic head 30 is provided to apply a magnetic field to an opto-magnetic recording medium 6. A lens 2 is a finite-imaging system objective which converges a divergent light beam from a semiconductor laser light source 1 directly on the opto-magnetic recording medium 6. The objective 2 has an object-side NA≈0.18 and an image-side NA≈0.55.

A divergent light beam emitted from the semiconductor laser device 1 provided as a light source for producing a light beam for recording or reproducing information is reflected by a polarized light separating film 4 of a polarization beam splitter 3, thereby being deflected toward the objective 2. The direction of polarization of the light beam emitted from the light source is represented by lines 5, and the light beam has a polarized wave surface perpendicular to the plane of paper of FIG. 3. The light beam in this forward optical path is incident as an s-polarized component upon the polarization beam splitter 3. Since the polarized light separating film 4 has an s-polarized component reflectance ≈85%, 85% of the quantity of light of the light beam in the forward optical path is deflected toward the objective 2. A detected light beam converged on the opto-magnetic recording medium 6 and reflected by the same travels through the objective 2 and passes as a convergent light beam through the polarized light separating film 4 of the polarization beam splitter 3. This convergent light beam is again reflected by a back reflecting film 7 formed integrally with the polarization beam splitter 3. Thereafter, the detected light beam passes through a halfwave plate 8 and is split into beams to detectors 10 by a polarization beam splitter 9 for magnetic differential detection and automatic focusing beam-size detection. An opto-magnetic signal, an automatic focusing (AF) signal and an automatic tracking (AT) signal are detected from the light beam by a well-known method.

To minimize the angle of incidence upon the polarized light separating film 4, it is necessary that the NA of the objective 2 on the light source side in the optical head optical system be small while the refractive index of the vitreous material is high. According to the present invention, the NA of the objective 2 on the light source side is set to 0.19 or less and the refractive index of the vitreous material at operating wavelengths is set to 1.7 or more, thereby enabling the angle of incidence on the film to be limited within the range of about [the incident angle of the principal ray] ±6°.

In this embodiment, since the object-side NA of the objective 2 is approximately 0.18, the angle of marginal (peripheral) rays with respect to the principal ray is 10.4°. A material having a refractive index of 1.79279 at operating wavelengths is selected as the vitreous material of the polarization beam splitter 3 to reduce the above-mentioned angle to 5.8°. Therefore, the range of compensation of an angle dependency of the film is at most 45°±6°.

In a first design example, the polarized light separating film 4 is a dielectric multilayer film formed of a lamination of six layers, i.e., three layers of silicon dioxide ($SiO_2$) and three layers of titanium dioxide ($TiO_2$) alternately superposed on the vitreous material. Each of the silicon dioxide layers has a thickness of 118.0 nm, while each of the titanium dioxide layers has a thickness of 306.8 nm.

Figure 4:
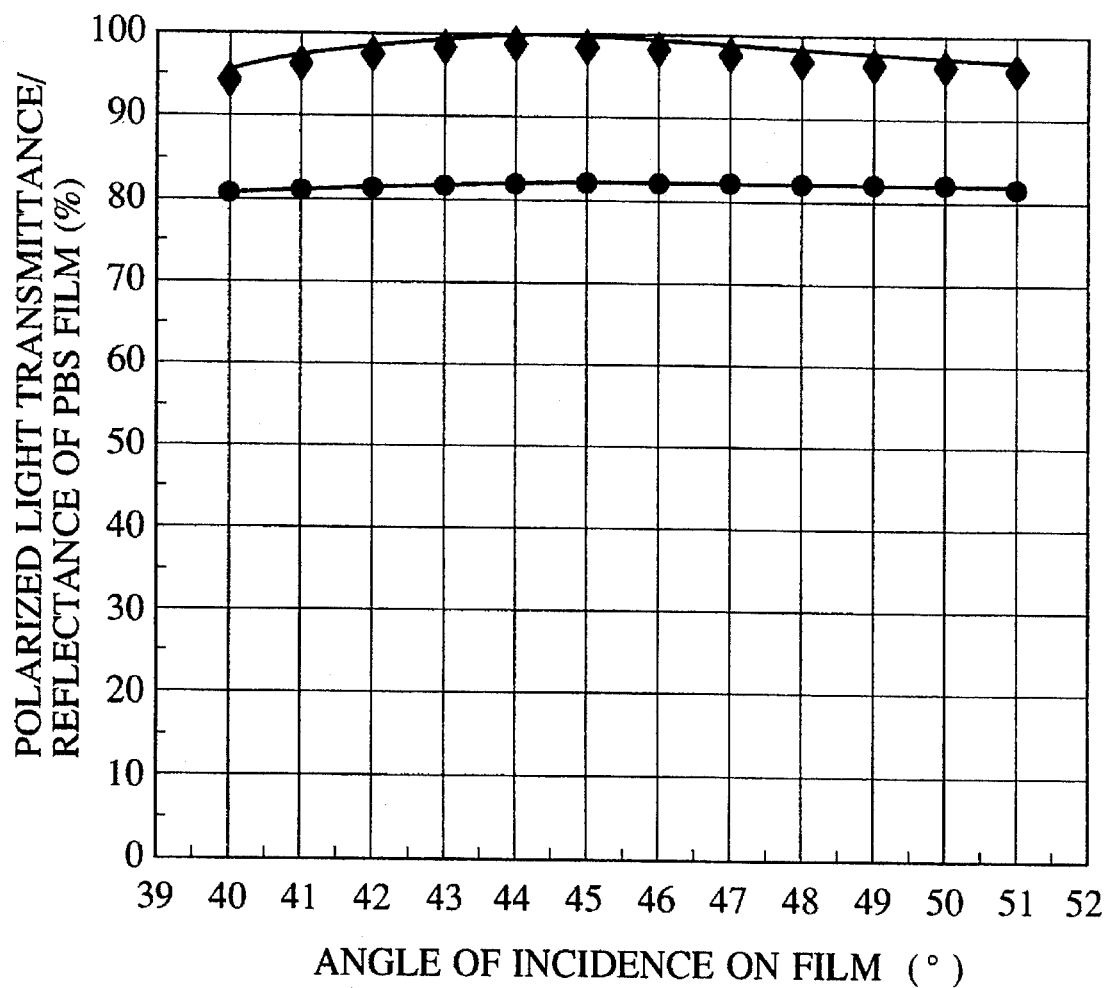
FIG. 4 is a graph showing an incident angle dependency of each of the transmittance and reflectance of the polarized light separating film of the first embodiment of the invention.

The graph of FIG. 4 shows incident angle dependencies of the polarized light transmittance and reflectance of the first design example of the film. In the graph of FIG. 4, the ordinate represents the transmittance and reflectance of the polarized light separating film while the abscissa represents the angle of incidence on the polarized light separating film. The symbol ♦ designates the transmittance Tp of p-polarized light, and the symbol ● designates the reflectance Rs of s-polarized light. As shown in FIG. 4, a flat characteristic is obtained in which Tp is higher than about 95% and Rs is 82±2% generally in the range of 45±6°. Thus, the obtained characteristics are flat.

Figure 5:
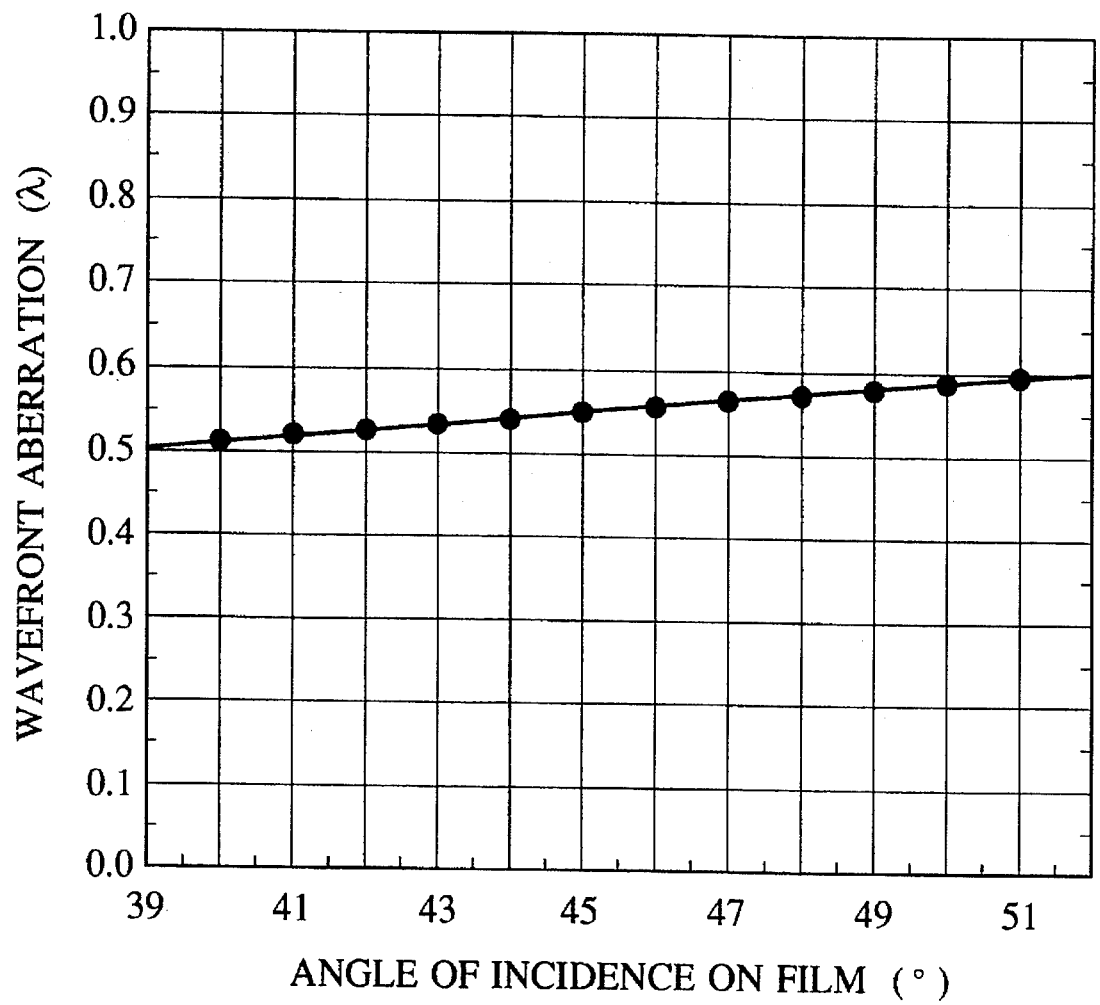
FIG. 5 is a graph showing an incident angle dependency of a wavefront aberration in the plane of incidence on the polarized light separating film of the first embodiment of the invention.

FIG. 5 shows a change in phase, i.e., a wavefront aberration caused in the light beam after reflection by the polarization beam splitter 3 in the forward optical path. In the graph of FIG. 5, the ordinate represents the quantity in terms of wavefront aberration in a cross section along the plane of incidence, converted from a phase distribution of the s-polarized component formed at the time of reflection by the polarized light separating film 4. The symbol ● designates the wavefront aberration. As is apparent from FIG. 5, the peak-to-peak value of the wavefront aberration is about 0.1 λ. Incidentally, if the direction of polarization is set parallel to guide grooves in the opto-magnetic medium, a tilt component and a coma which are dominant components of the above-mentioned aberration are directed in the radial direction. However, there is no problem of such components since the maximum value of aberration is about 0.1 λ, as mentioned above.

When the detected light returned from the recording medium passes through the polarized light separating film 4, a phase difference is created according to the incident angle. In the system of the present invention, a Fresnel component corresponds to the s-polarized component while a Kerr component corresponds to the p-polarized component.

Figure 6:
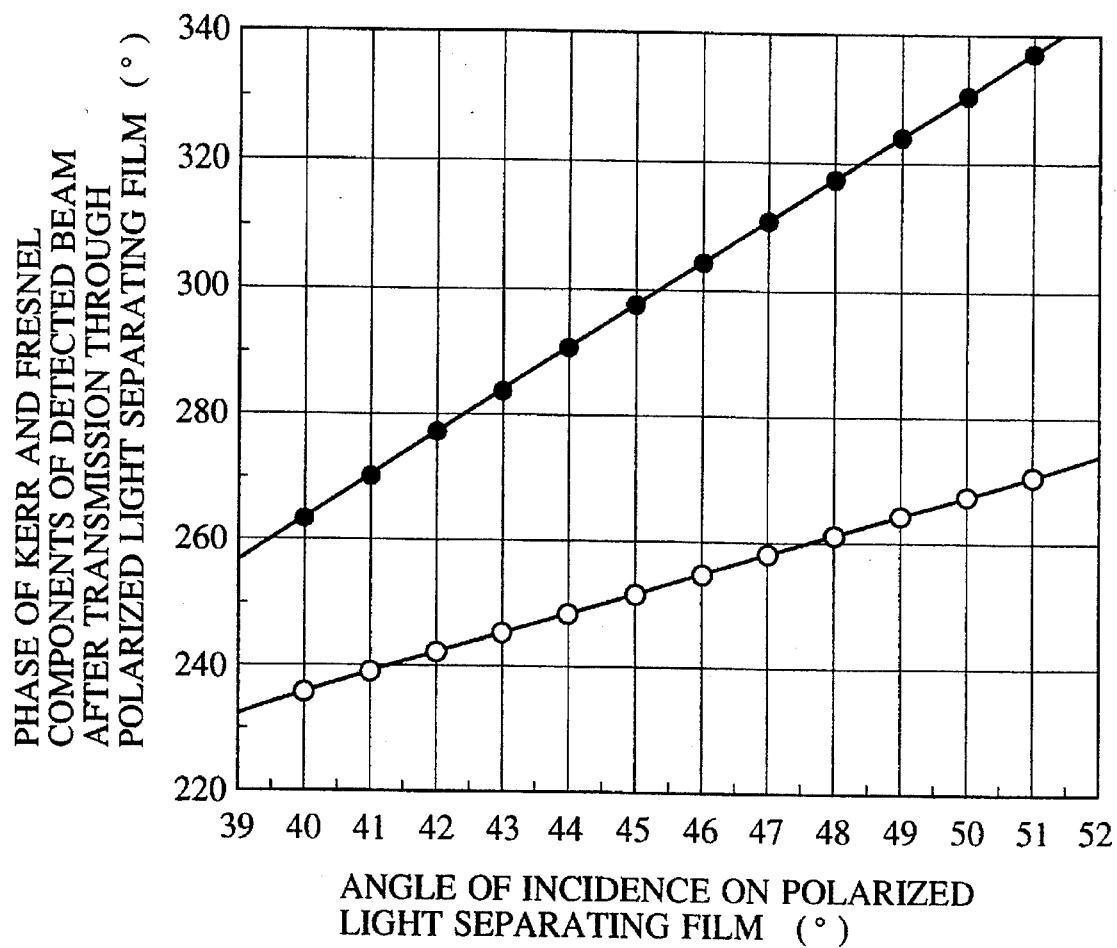
FIG. 6 is a graph showing an incident angle dependency of the phase of a light beam passing through the polarized light separating film of the first embodiment of the invention.

The detected light beam transmitted through the polarization beam separating film 4 has a phase difference between the Fresnel component and the Kerr component. The phase difference varies with the incident angle. The graph of FIG. 6 shows an incident angle dependency of the phase of each polarized light component. In the graph of FIG. 6, the ordinate represents the phase of each polarized light component after transmission through the polarized light separating film 4 while the abscissa represents the angle of incidence on the polarized light separating film 4. The symbol ● designates the phase of the p-polarized component, and the symbol ○ designates the phase of the s-polarized component.

Figure 7:
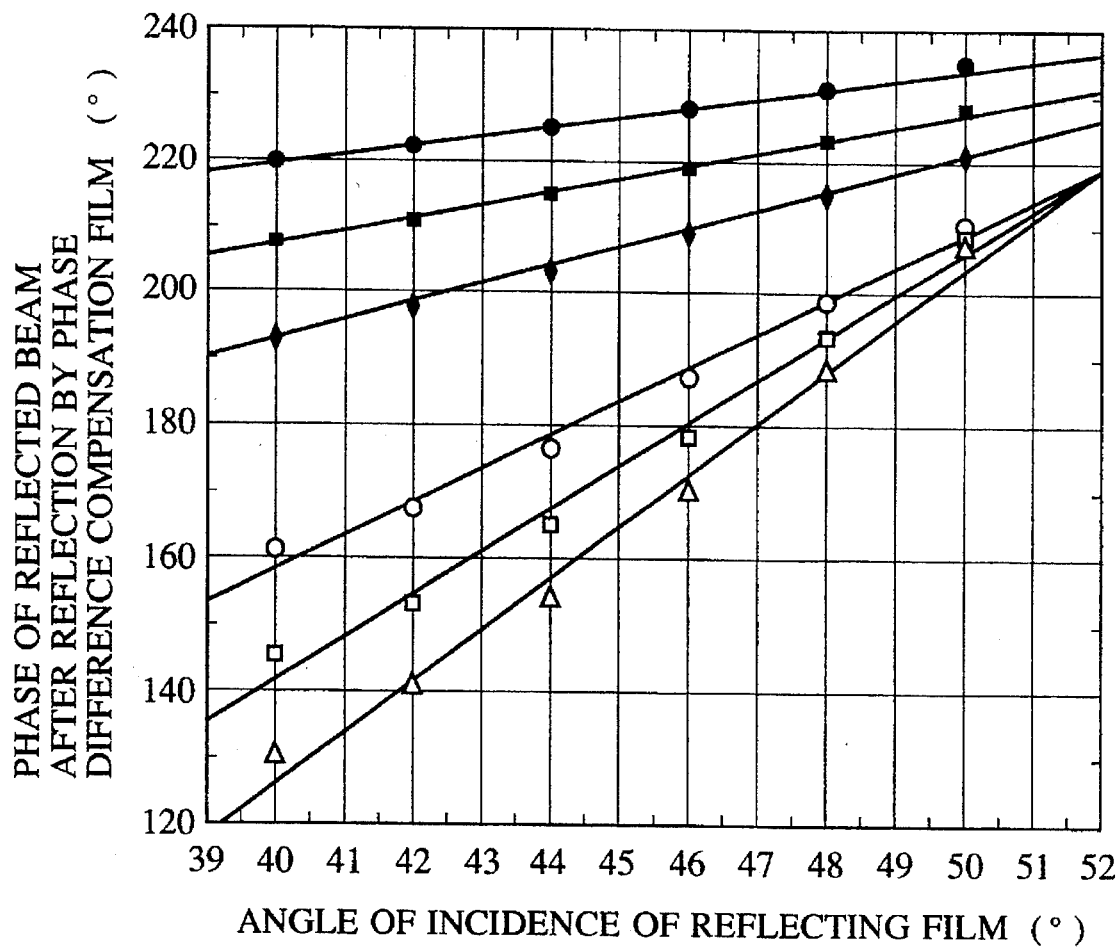
FIG. 7 is a graph showing an incident angle dependency of the phase of a light beam reflected by the polarized light separating film of the first embodiment of the invention.

The detected light beam is reflected and deflected by the reflecting film 7 for phase difference compensation. The graph of FIG. 7 shows an incident angle dependency of the phase difference created by reflection on this compensating film 7. In the graph of FIG. 7, the ordinate represents the phase after reflection by the reflecting film 7 for phase difference compensation while the abscissa represents the angle of incidence on the reflecting film. FIG. 7 shows the results of measurement of three types of design examples A, B, and C. The pairs of symbols ○ and ●, □ and ■, and △ and ♦ designate the types A, B, and C, respectively. Of these symbols, the solid ones designate the s-polarized component while the blank ones designate the p-polarized component.

The compensating film 7 is formed as a total reflection film unlike the polarized light separating film 4 with respect to the transmittance and reflectance. With respect to the incident angle dependency, the compensating film is designed so as to satisfy the conditions described below by considering the characteristics of the polarized light separating film 4.

(1) The sign and the absolute value of the inclinations of the characteristics (sensitivity of phase change with respect to the incident angle) of the polarized light separating film 4 shown in FIG. 6 and those shown in FIG. 7 are set so as to be approximately equal to each other.

(2) The phase differences between p-polarized light and s-polarized light at an incident angle of 45° are equalized in absolute value but have opposite signs. However, if the phase differences created by the two films at the incident angle of 45° are each approximately zero, they may have any sign relationship. (A phase difference in the range of 10° to 20° may be regarded as "approximately zero" in some cases according to a phase difference allowance distribution in the entire optical system.)

Figure 8:
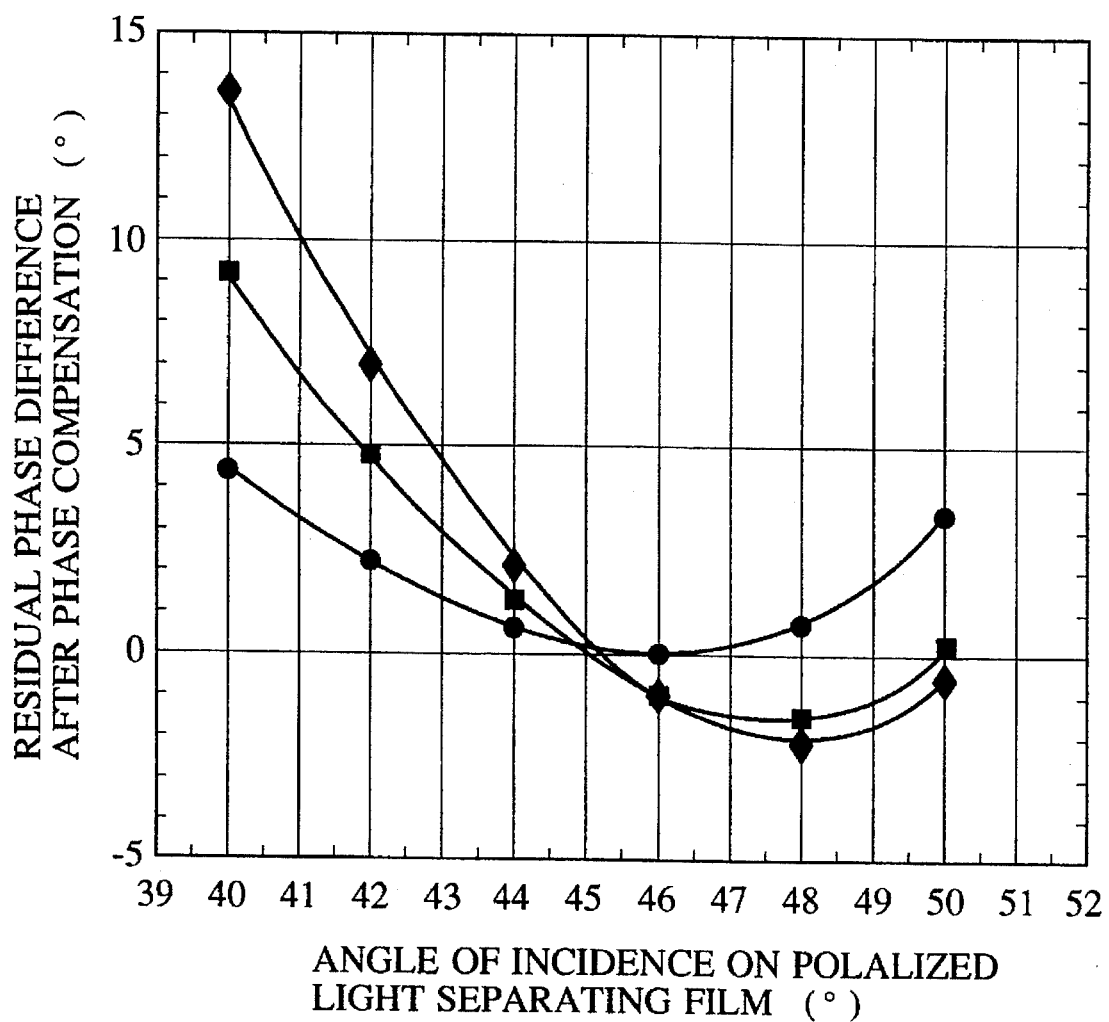
FIG. 8 is a graph showing an incident angle dependency of a residual phase difference after phase compensation of the first embodiment of the invention.

For example, a marginal ray incident at an angle of 45°+6° on the polarized light separating film 4 is incident at an angle of 45°−6° on the compensating film 7, and a marginal ray incident at an angle of 45°−6° on the polarized light separating film 4 is incident at an angle of 45°+6° on the compensating film 7. Therefore, the phase difference created by transmission through the polarized light separating film 4 is canceled at the time of reflection by the compensating film 7. FIG. 8 shows a residual phase difference uncanceled due to a small difference between the angle dependencies of the phase shown in FIGS. 6 and 7. In the graph of FIG. 8, the ordinate presents the residual phase difference after phase compensation while the abscissa represents the angle of incidence on the polarized light separating film. The symbols ●, ■, and ♦ designate the types of phase difference compensating reflecting films A, B, and C, respectively.

As is apparent from FIG. 8, even the largest residual phase difference in the case of the type C is totally within the range of about 20° (±10°). In the case of type A, the residual phase difference is much smaller, i.e., 5° to 6°, and has essentially no influence.

It is easy to set the reflectance of the back reflecting film 7 for phase difference compensation close to 100%, since this reflecting film is of a back reflection type. The reflecting film 7 can be designed with greater freedom by taking only the phase difference into consideration. The three design examples A, B, and C have therefore been shown. The film of each example can be formed so as to have a smaller number of layers, i.e., six layers in this embodiment.

The reflecting film 7 is a dielectric multilayer film formed of a lamination of six layers, i.e., three layers of silicon dioxide ($SiO_2$) and three layers of titanium dioxide ($TiO_2$) alternately superposed. In the type A film, each silicon dioxide layer has a thickness of 70.0 nm while each titanium dioxide layer has a thickness of 140.5 nm. In the type B film, each silicon dioxide layer has a thickness of 90.0 nm while each titanium dioxide layer has a thickness of 132.5 nm. In the type C film, each silicon dioxide layer has a thickness of 110.0 nm while each titanium dioxide layer has a thickness of 124.5 nm. Needless to say, compensating reflecting films having intermediate characteristics between those of the types A to C can be formed by setting the film thickness ratio to intermediate values between the ratios of the above-mentioned values.

In this embodiment, the objective 2 forms a finite imaging system and only one objective 2 may be driven for AF and AT servo operations. Arrows 11 in FIG. 3 designate the directions in which the objective 2 can be moved. The direction across the tracks of the opto-magnetic recording medium 6 is parallel to the plane of paper of FIG. 3.

The phase difference between the p- and s-polarized light components created in the detected light beam is compensated for by the above-described arrangement. The detected light beam then passes the halfwave plate 8 disposed in the optical path and is split into two beams for opto-magnetic signal differential detection by the polarization beam splitter 9, as mentioned above. Also, servo signals for opto-magnetic signal detection are simultaneously separated and detected from the light beam.

Figure 9:
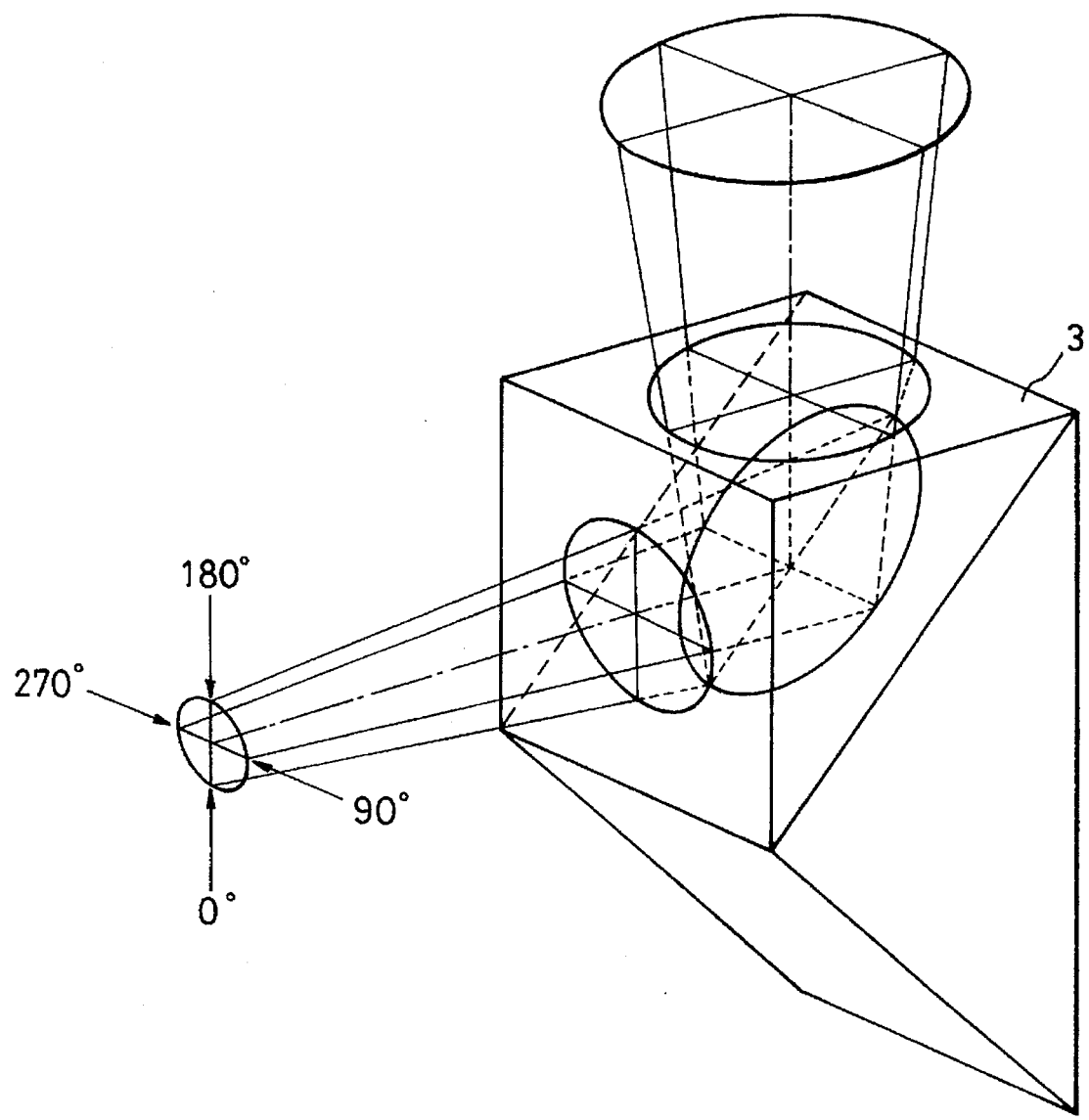
FIG. 9 is a diagram of the incident angle with respect to azimuths of the first embodiment of the present invention.

The influence on component rays in the direction perpendicular to the plane of paper of FIG. 3 will be described. Only the influence in the plane of incidence on the polarization beam splitter 3 has been described. If the marginal rays in FIG. 3 have angles of 0° and 180° as azimuths of the light beam, as shown in FIG. 9, marginal rays in the direction perpendicular to the plane of paper of FIG. 3 correspond to azimuths of 90° and 270°. With respect to marginal rays in this direction, even if the angle from the principal ray is 10°, the incident angle differs from 45° only by an angle smaller than 1° because the plane of incidence on each of the polarized light separating film 4 and the phase difference compensating film 7 turns. Accordingly, rays in the direction of azimuths of 90° and 270° can be regarded as being in the same condition as the principal ray. Rays having azimuths other than the above-mentioned four azimuths are in intermediate conditions, and the difference in incident angle from 45° of such rays is smaller than that of rays of azimuths of 0° and 180°, and the phase difference thereof is canceled in the same manner. Therefore, there is no problem with respect to such rays.

As described above, a polarization beam splitter may be arranged to form an optical head by effecting reflection in a forward optical path and transmission in a backward optical path in order to eliminate the influence of the polarized light separating film as a wavefront aberration on the light beam in the forward optical path, i.e., the incident angle dependency of phase modulation of polarized components of the light in the forward optical path as well as to limit the wavelength dependency of the transmittance and reflectance of the separating film and to eliminate the incident angle dependency to obtain a flat characteristic.

To reduce a burden on the film design, it is important to reduce the NA of the light-source-side objective of the optical head optical system and to increase the refractive index of the vitreous material so that the angle of incidence on the film is minimized. The angle of incidence on the film may be limited within the range of about [the incident angle of the principal ray] ±6° by setting the object-side NA of the objective to 0.19 or less and the refractive index at operating wavelengths to 1.7 or more. It is possible to reduce the burden on the film design by selecting these values.

Further design examples of the polarized light separating film will be described to determine conditions of usable dielectric multilayer films.

Second Design Example

It is assumed here that the vitreous material of the polarization beam splitter is G, the refractive index of this material is ng, a material having a relatively-high refractive index is H, a material having a low refractive index is L, and the refractive indexes of these materials are nh and nl. It is also assumed that the air-equivalent thickness of H is dh, and the air-equivalent thickness of L is dl (each value defined with respect to a d-line wavelength).

The structure of the polarized light separating film is a four-layer structure of G/H/L/H/L in the direction of traveling of light in which ng=1.76 (PBH 14 by Kabushiki Kaisha OHARA), H: TiO$_2$, nh=2.19, dh=144 nm, and L: MgF$_2$, nl=1.38, dl=216 nm.

Figure 10:
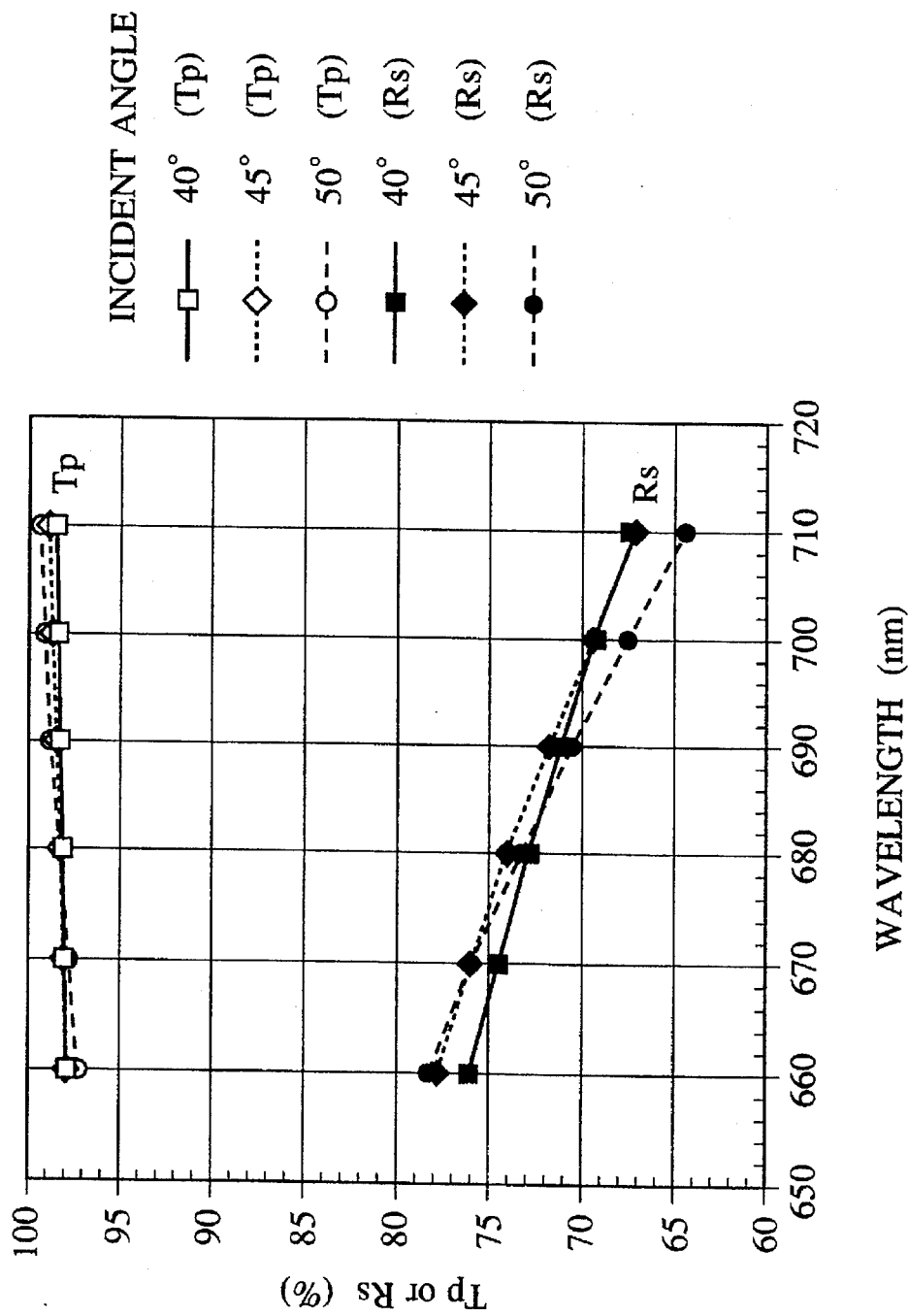
FIG. 10 is a graph showing a wavelength dependency of each of the transmittance and reflectance of a polarized light separating film in a second design example.

The result is as shown in FIG. 10 with the wavelength and the incident angle used as parameters. The wavelength dependency is limited. That is, in a range about a central wavelength of 685 nm, i.e., 685±10 nm, the change in each of Tp and Rs is limited to ±3%. With respect to changes in incident angle about a central incident angle of 45°, i.e., in the range of 45°±5°, the change in each of Tp and Rs is limited to ±1%. Thus, the obtained characteristics are flat.

Third Design Example

The structure of the polarized light separating film is a four-layer structure of G/H/L/H/L in which ng=1.76 (PBH 1 by Kabushiki Kaisha OHARA), H: Compound of ZrO$_2$/TiO$_2$, nh=2.07, dh=155 nm, and L: SiO$_2$, nl=1.45, dl=232 nm (each value defined with respect to a d-line wavelength).

Figure 11:
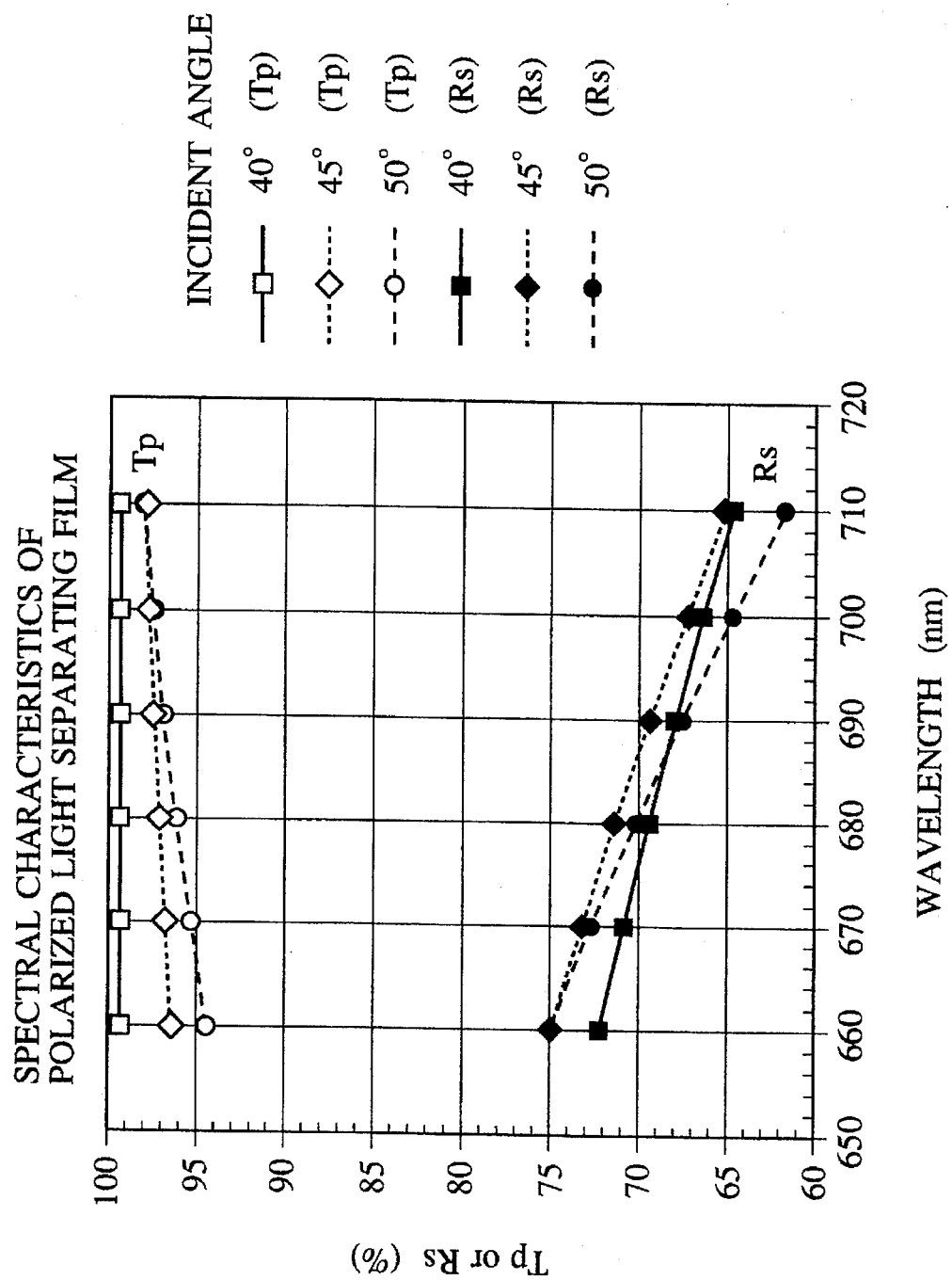
FIG. 11 is a graph showing a wavelength dependency of each of the transmittance and reflectance of a polarized light separating film in a third design example.

The desirable result is obtained as shown in FIG. 11 with the wavelength and the incident angle used as parameters.

Fourth Design Example

The structure of the polarized light separating film is a six-layer structure of G/H/L/H/L/H/L in which ng=1.76 (LAH 53 by Kabushiki Kaisha OHARA), H: TiO$_2$, nh=2.19, dh=264 nm, and L: SiO$_2$, nl=1.45, dl=294 nm (each value defined with respect to a d-line wavelength).

Figure 12:
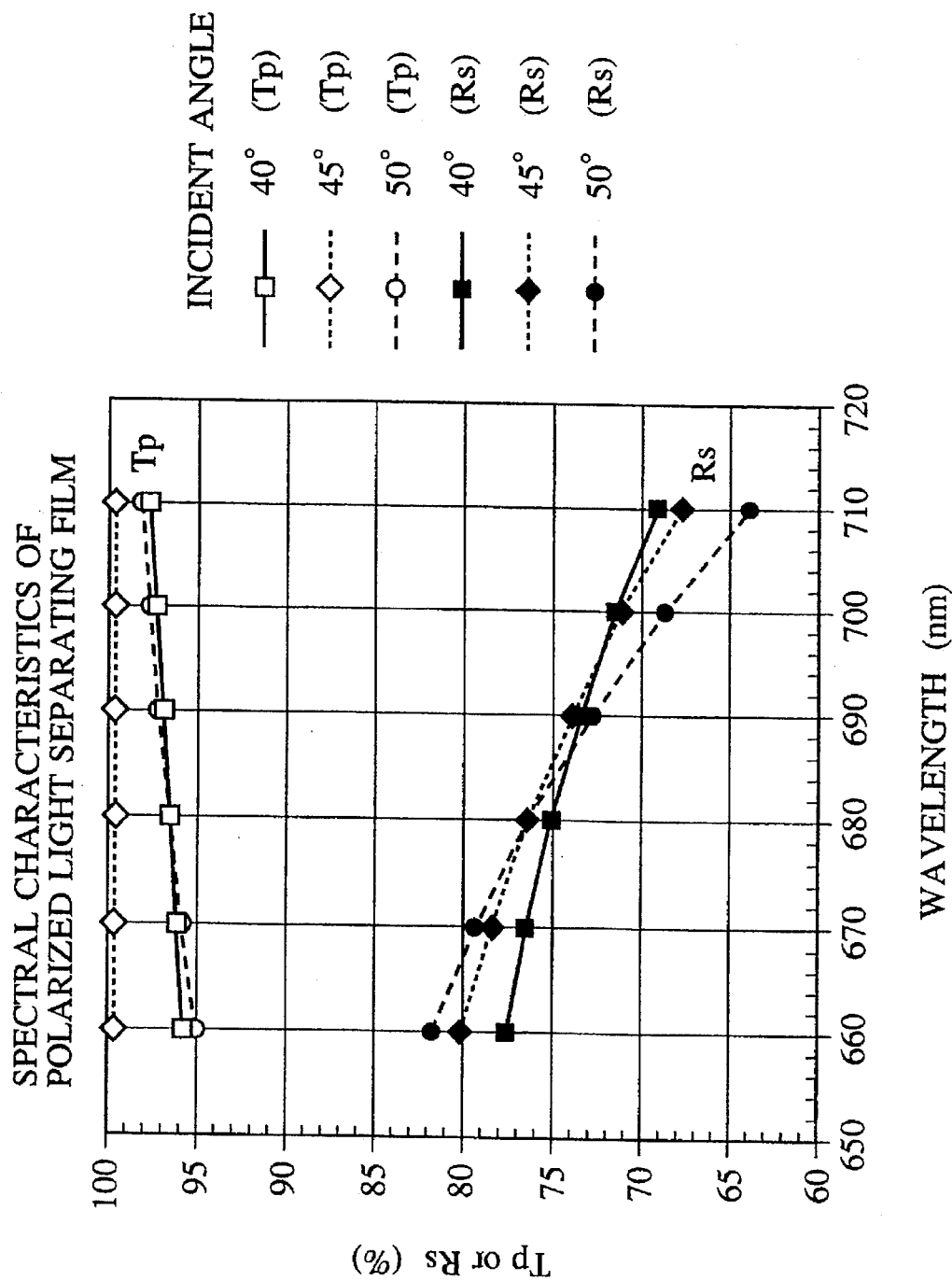
FIG. 12 is a graph showing a wavelength dependency of each of the transmittance and reflectance of a polarized light separating film in a fourth design example.

The desirable result is obtained as shown in FIG. 12 with the wavelength and the incident angle used as parameters.

First, from the above-described results, the following conditions can be determined. That is, if the number of film layers is N, $N \geq 4$.

Second, the ratio of the refractive indexes of the material having a relatively high refractive index and the material having a low refractive index, i.e., nh/nl is limited by $$1.4 < (nh/nl) < 1.6.$$

Third, from the above-mentioned condition of the vitreous material, $$ng \geq 1.7.$$

Further, the reflecting surface for compensating for the phase difference created in the detected light beam by transmission through the polarized light separating film is not formed as the same film as the polarized light separating film as in the conventional art, since the polarized light separating film functions as a transmission film for the detected light beam.

The reflecting surface 7 for phase difference compensation can easily be formed as a back reflecting dielectric multilayer film to obtain a high reflectance close to 100% with respect to both p- and s-polarized light. Only the incident angle dependency of the phase difference of the reflected light beam may be designed in accordance with that of the transmission polarized light separating film capable of transmission. Since the reflectance is not considerably reduced from 100%, the film may be designed by paying attention only to the phase difference. Therefore, a design can be easily made by setting a smaller number of film layers. Because this film has a high reflectance, the film design is free from apprehension of transmission loss of the quantity of light when phase difference compensation is made.

The light beam in the forward optical path is emitted from the semiconductor laser device provided as a light source and is incident as s-polarized light on the polarization beam splitter. For example, the film of the polarization beam splitter is formed so as to have transmittance and reflectance characteristics such that Tp=97±3% and Rs=70 to 85±3%. The light beam in the forward optical path is reflected by this polarization beam splitter to travel to the recording medium.

The detected light beam passes the polarization beam splitter and is reflected and deflected by the back reflecting mirror formed integrally with the polarization beam splitter.

The polarized light separating film of the polarization beam splitter is designed so that the principal ray incident angle is about 45°, and so that the above-mentioned transmittance and reflectance characteristics in the incident angle is about 45°±6°. The phase change created in the light beam incident as s-polarized light from the light source and reflected and deflected by the polarization beam splitter in the forward optical path results in a wavefront aberration. Therefore, it is necessary to consider means for limiting this phase change.

Figure 13:
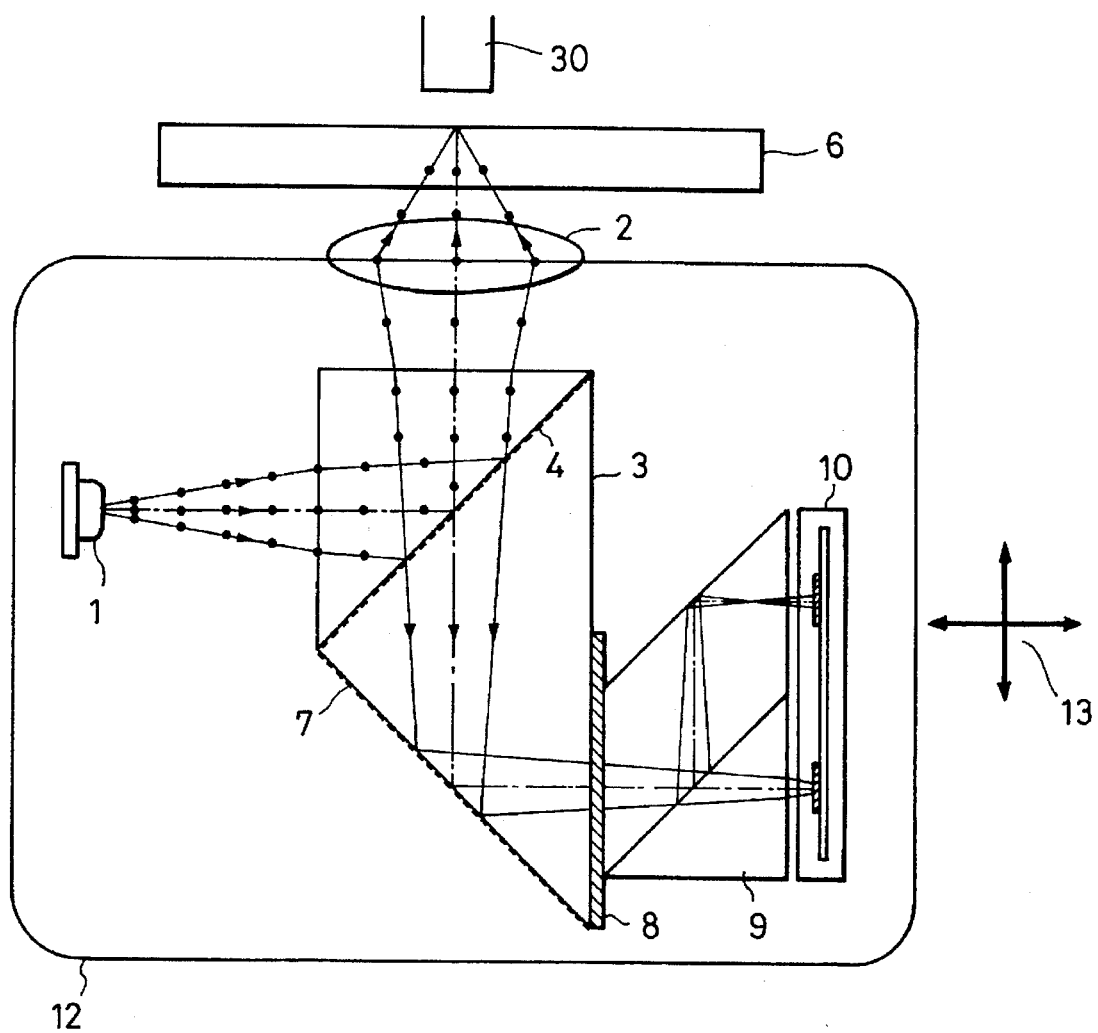
FIG. 13 is a schematic diagram of the configuration of an optical head for an opto-magnetic recording and reproducing apparatus in accordance with a second embodiment of the present invention.

FIG. 13 shows an optical head for an opto-magnetic recording and reproducing apparatus in accordance with a second embodiment of the present invention.

In the second embodiment of the present invention, a polarization beam splitter 3 having a back reflecting surface for phase difference compensation integrally formed thereon, an analyzer (polarization beam splitter) 9 for opto-magnetic differential detection, detectors 10, and a semiconductor laser device 1, which are the same as those of the first embodiment, are formed as miniaturized parts and are mounted on an actuator 12 in combination with an objective 2 forming a finite imaging system. The component parts of the optical system form one unit integrally driven. The distance between the light source 1 and the objective 2 is constant even when the actuator 12 is driven (in the direction of arrows 13). Therefore, it is possible to prevent intervention of an offset in a servo signal with a lens drive.

Figure 14:
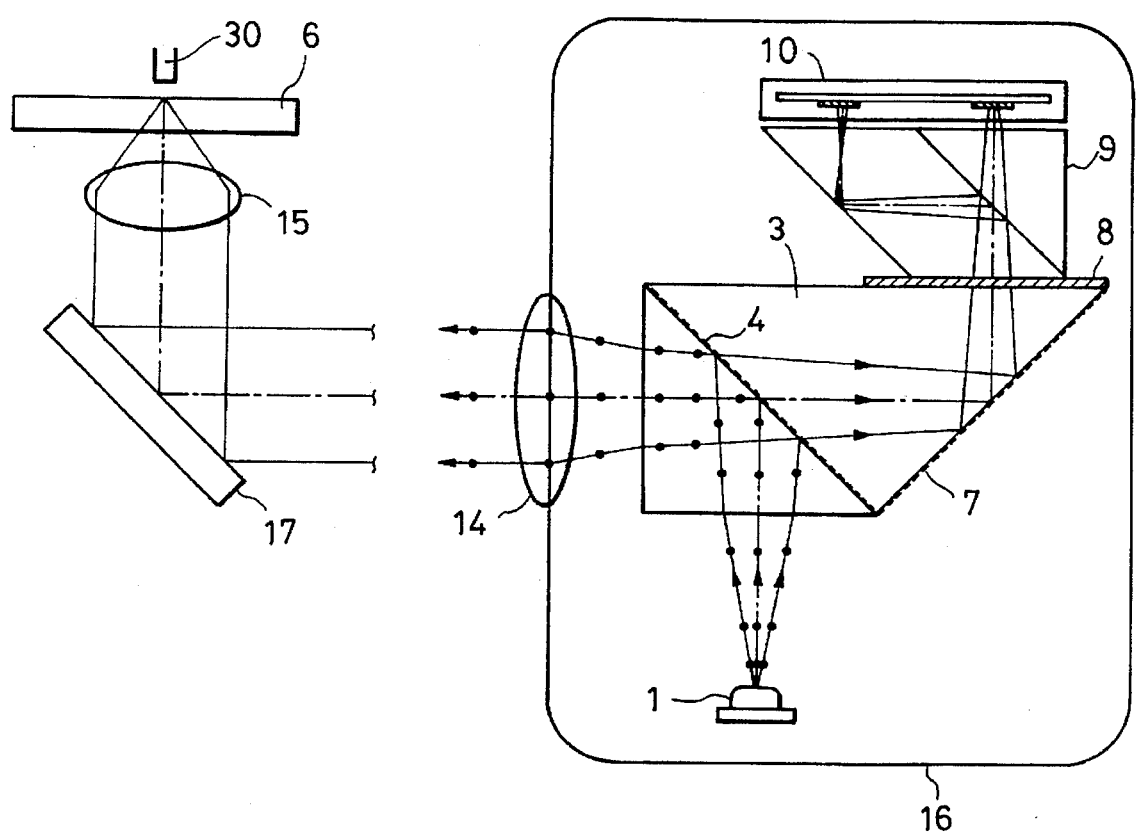
FIG. 14 is a schematic diagram of the configuration of an optical head for an opto-magnetic recording and reproducing apparatus in accordance with a third embodiment of the present invention.

FIG. 14 shows an optical head for an opto-magnetic recording and reproducing apparatus in accordance with a third embodiment of the present invention.

In the third embodiment of the present invention, a polarization beam splitter 3 having a back reflecting surface for phase difference compensation integrally formed thereon, an analyzer (polarization beam splitter) 9 for opto-magnetic differential detection, detectors 10, and a semiconductor laser device 1, which are the same as those of the first embodiment, are combined with a collimator lens 14, and a parallel beam is bent by a mirror 17 and is converged on an opto-magnetic recording medium 6 by an objective 15 forming an infinite imaging system. To minimize the angle of incidence on the polarized light separating film 4, it is necessary to reduce the NA of the collimator lens 14 and to increase the refractive index of the vitreous material. In this embodiment, the NA of the collimator lens is set to 0.20 or less and the refractive index of the vitreous material is set to 1.7 or more, thereby enabling the angle of incidence on the polarized light separating film to be limited within the range of about [the incident angle of the principal ray] ±6°.

Advantageously, in this embodiment, a fixed head portion of the separated optical system head can be reduced in size.

Figure 15:
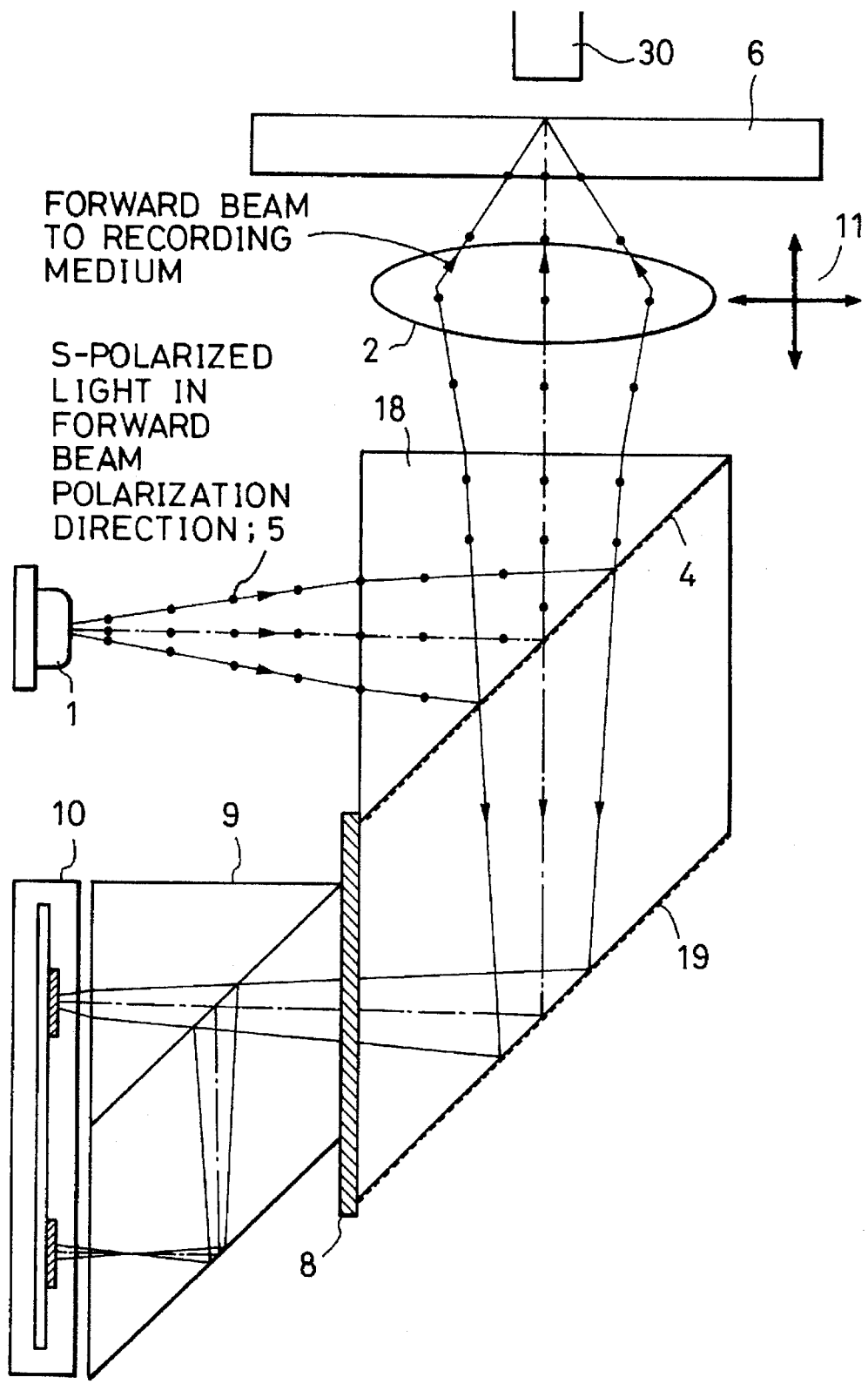
FIG. 15 is a schematic diagram of the configuration of an optical head for an opto-magnetic recording and reproducing apparatus in accordance with a fourth embodiment of the present invention.

FIG. 15 shows an optical head for an opto-magnetic recording and reproducing apparatus in accordance with a fourth embodiment of the present invention.

In this embodiment, a semiconductor laser device 1, an objective 2, a polarized light separating film 4, the NA of the objective 2, and the vitreous material of a polarization beam splitter 18 are the same as those in the first embodiment. However, the inclination of a phase compensating reflecting surface 19 is in an inverse relationship with that of the first embodiment. Therefore, the phase difference characteristics of the phase compensating reflecting surface 19 of the fourth embodiment are designed so as to satisfy the conditions described below.

(1) The inclinations of the characteristics (sensitivity of phase change with respect to the incident angle) of the polarized light separating film 4 shown in FIG. 6 and those shown in FIG. 7 are set so as to be approximately equal to each other but have opposite signs.

(2) The phase differences between p-polarized light and s-polarized light at an incident angle of 45° are equalized in absolute value but have opposite signs. However, if the phase differences created by the two films at the incident angle of 45° are each approximately zero, they may have any sign relationship. (A phase difference in the range of 10° to 20° may be regarded as "approximately zero" in some cases according to a phase difference allowance distribution in the entire optical system.)

The reflectance of this compensating film is approximately 100%, as in the first embodiment.

For example, a marginal ray incident at an angle of 45°+6° on the polarized light separating film 4 is incident at an angle of 45°+6° on the phase compensating film 19, and a marginal ray incident at an angle of 45°−6° on the polarized light separating film 4 is incident at an angle of 45°−6° on the phase compensating film 19. Therefore, the phase difference created by transmission through the polarized light separating film 4 is canceled at the time of reflection by the phase compensating film 19.

Advantageously, in this embodiment, the light source and the detection system can be disposed on the same side.

Figure 16B:
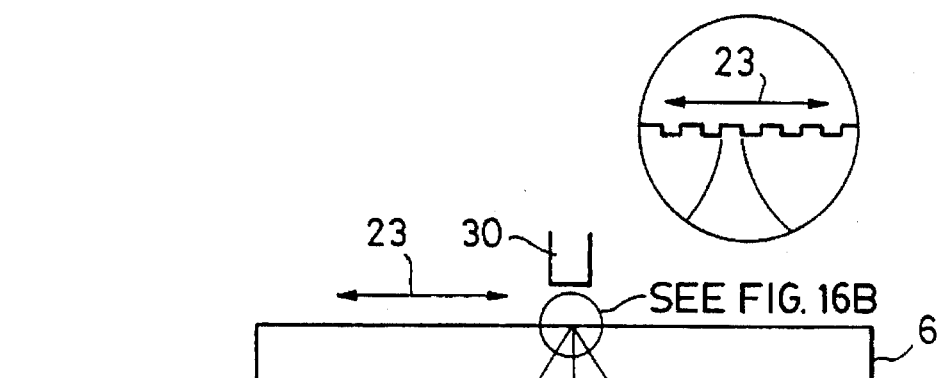
FIG. 16B shows the direction of polarization of a light beam in a forward optical path and FIG. 16C shows a detail of a limiting aperture, in accordance with a fifth embodiment of the present invention.
Figure 16A:
FIG. 16A is a schematic diagram of the configuration of an optical head for an opto-magnetic recording and reproducing apparatus.

FIG. 16A shows an optical head for an opto-magnetic recording and reproducing apparatus in accordance with a fifth embodiment of the present invention.

A divergent light beam emitted from a semiconductor laser device 1 provided as a light source is reflected by a polarized light separating film 22 of a polarization beam splitter 20, thereby being deflected toward an objective 2. The direction of polarization of the light beam emitted from the semiconductor laser device 1 is represented by lines 5, and the light beam has a polarized wave surface perpendicular to the plane of paper of FIG. 16A. The light beam in this forward optical path is incident as an s-polarized component upon the polarization beam splitter 20. Because the polarized light separating film 22 has an s-polarized component reflectance ≈82%, 82% of the quantity of light of the light beam in the forward optical path is deflected toward the objective 2. A detected light beam converged on the opto-magnetic recording medium 6 and reflected by the same travels through the objective 2 and passes as a convergent light beam through the polarized light separating film 22 of the polarization beam splitter 20.

Figure 17:
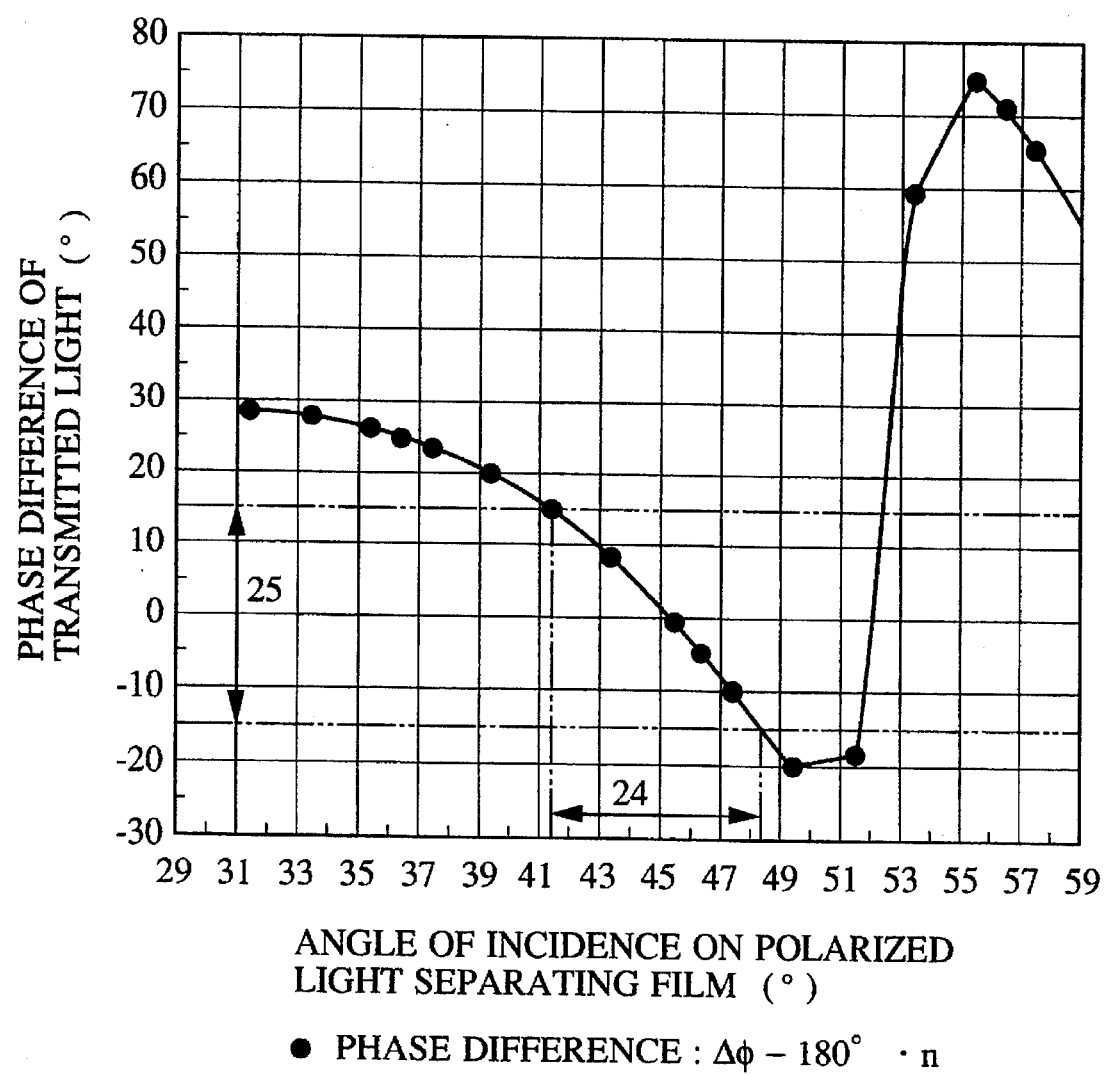
FIG. 17 is a graph showing an incident angle dependency of a phase difference of a light beam passed through a polarized light separating film of the fifth embodiment of the invention.

When the detected light returned from the recording medium passes through the polarized light separating film 22, a phase difference is created according to the incident angle. In the system of the present invention, a Fresnel component corresponds to the s-polarized component while a Kerr component corresponds to the p-polarized component. The detected light beam transmitted through the polarization beam separating film 22 has a phase difference between the Fresnel component and the Kerr component. The phase difference varies with the incident angle. The graph of FIG. 17 shows an incident angle dependency of the phase difference of each polarized light component created at this time.

To minimize the angle of incidence upon the polarized light separating film 22, it is necessary that the NA of the objective 2 on the light source side in the optical head optical system is small while the refractive index of the vitreous material is high. According to the present invention, the NA of the objective 2 on the light source side is set to 0.19 or less and the refractive index of the vitreous material at operating wavelengths is set to 1.7 or more, thereby enabling the angle of incidence on the film to be limited within the range of about [the incident angle of the principal ray] ±6°.

In this embodiment, since the object-side NA of the objective 2 is approximately 0.18, the angle of marginal rays with respect to the principal ray is 10.4°. A material having a refractive index of 1.79279 at operating wavelengths is selected as the vitreous material of the polarization beam splitter 20. Accordingly, the above-mentioned angle can be reduced to 5.8. However, as is apparent from the graph of FIG. 17, when marginal rays are incident at angles in the range of ±5.8° with respect to the principal ray at an incident angle of 45°, the phase difference is about ±20° at the maximum, and a margin of an ordinary phase difference allowance is thereby removed nearly entirely. Therefore, it is difficult to directly put this arrangement to use. The condition becomes more unfavorable if the refractive index of the vitreous material is lower.

Incidentally, there is now an increased demand for opto-magnetic disks having larger capacities, and various means have been tried to improve the recording density of these kinds of disks. Among such means, there is a method of reducing the track pitch to increase the capacity. On the other hand, as one of the problems of opto-magnetic disk apparatuses, there is a problem of cross-talk between adjacent tracks, i.e., a problem that, when a light spot is tracking a certain track to read out information, a diffraction ring of this spot simultaneously reproduces information of an adjacent track to mix the information written in the adjacent track in the signal presently read out from the target track. This problem becomes more considerable if the track pitch is smaller. Even with the same track pitch, a phenomenon described below is possible. That is, if the disk is warped in a radial direction (if the disk has a tilt), the spot on the disk may have a radial coma, so that a diffraction ring (side lobe) on one of the adjacent tracks is increased, resulting in occurrence of large cross-talk. Therefore, to reduce the track pitch, it is necessary to limit such a disk tilt. However, it is particularly difficult to limit such tilt to a required level of, for example, 2 to 3 mrad because of a reason relating to disk productivity.

Then, a method of disposing a limiting aperture for shutting off cross-talk components from adjacent tracks in the detected light beam may be used.

If portions of the detected light beam, mostly opposite-end portions closer to adjacent tracks, are cut off, cross-talk components from adjacent tracks can be selectively reduced largely while the reduction in the necessary signal components is limited. To effectively reduce cross-talk component from adjacent tracks, an elliptical aperture having a width which is 55 to 90%, more preferably 60 to 80% of the diameter of the detected light beam in the radial direction (100% in the tracking direction), or a 50 to 85%, more preferably a 55 to 75% width rectangular aperture (100% in the tracking direction) may be disposed in the optical path for the detected light beam. The above-mentioned diameter of the detected light beam is defined as a diameter at the position of the inserted aperture, since the detected light beam is a convergent beam.

On the other hand, the angle of incidence of the principal ray on the polarized light separating film 22 is 45°, and the phase difference is larger with respect to marginal rays having incident angles of 45°±5.7° in this embodiment, as can be understood from the graph of FIG. 17. For example, in a case where the maximum phase difference allowance is ±15° (indicated by arrows 25 in FIG. 17), the phase difference is limited within the allowance range (indicated by arrows 25 in FIG. 17) if rays in the light beam having the largest phase differences are limited to those incident at angles within the range of 45°±3.5° on the polarized light separating film 22. Accordingly, the influence of the phase difference can be eliminated if the above-described limiting aperture is provided to act on the detected light beam transmitted through the polarization beam splitter 20 so that rays of the light beam having angles of incidence on the polarized light separating film 22 out of the range of 45°±3.5° are cut off. This range of ±3.5° correspond to angles of ±6.3° in air. Consequently, the NA of 0.18 of the light beam may be reduced to an NA of 0.11. In other words, the effective diameter of the detected light beam may be reduced to 62% of the original diameter.

Figure 16C:
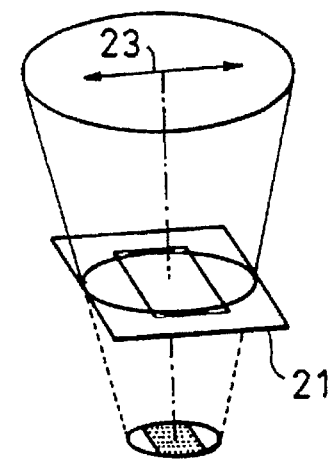

The above-described limiting aperture is indicated at 21 in FIG. 16A. It may have a rectangular shape or an elliptical shape such as not to stop marginal component rays located at the ends of the beam with respect to an axis perpendicular to the paper of FIG. 16A, as shown in FIG. 16C. As mentioned above, the angle of incidence on the polarized light separating film 22 of marginal rays in the direction of azimuths of 90° and 270° has essentially no difference from the incident angle of 45°. Therefore, the phase difference of light beam components in this direction is not a problem.

As shown in FIG. 16B, the direction of polarization of the light beam in the forward optical path on the recording medium is set parallel to the guide grooves. Therefore, portions of the light beam adjacent to the two adjacent tracks are influenced by the phase difference created by transmission through the polarized light separating film 22. According to the present invention, therefore, it is possible to eliminate the influence of the phase difference together with the influence of cross-talk from adjacent tracks.

As described above, in the fifth embodiment of the present invention, a smaller optical system arrangement can be provided without using a back reflecting film for phase difference compensation.

To optimize the above-described effect, the phase difference characteristics of the polarization beam splitter of the fifth embodiment is designed so as to satisfy the conditions described below.

(1) The inclinations of the characteristics (sensitivity of phase change with respect to the incident angle) of the polarized light separating film 22 shown in FIG. 16A are designed by considering the width of the above-mentioned aperture for cutting cross-talk from adjacent tracks. That is, a phase characteristic will suffice such that the phase difference of marginal rays of the light beam determined by the aperture width is within the allowable range.

(2) The phase difference between the p- and s-polarized components at the incident angle of 45° is approximately zero. (A phase difference in the range of 10° to 20° may be regarded as "approximately zero" in some cases according to a phase difference allowance distribution in the entire optical system.)

The present invention realizes a finite imaging system having more stable characteristics in an optical head used in an opto-magnetic recording and reproducing apparatus.

In particular, with respect to the first to fourth embodiments, (1) Transmittance and reflectance characteristics can be obtained which are uniform through the entire effective light beam diametrical area in the forward optical path, so that there is no considerable influence upon the shape of the light spot on the recording medium.

(2) There is substantially no influence of an unnecessary aberration on the light beam in the forward optical path.

(3) A large quantity of light reaching the detectors can be maintained through the entire effective light beam diametrical area, thereby reducing the influence of noise.

(4) The phase compensating surface is formed as a back reflecting surface. Therefore, there is no need to attach a glass member, and only attachment of a film will suffice.

With respect to the fifth embodiment, (5) A phase difference is cut off without being compensated for. The influence of the phase difference is thereby eliminated. Moreover, cross-talk from adjacent tracks can be removed simultaneously. Therefore, a reduction in the track pitch on the disk and an increase in tilt allowance can also be achieved as well as an improvement in the head optical system.

While the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical information recording and reproducing apparatus comprising:
   a light source for producing a light beam for at least one of recording and reproducing information;
   an objective for converging a divergent light beam from said light source on an optical recording medium and for converging a reflected light beam from said optical recording medium;
   a polarization beam splitter disposed between said light source and said objective, said polarization beam splitter having a polarized light separating surface for reflecting the divergent light beam from said light source and leading the reflected light beam to said objective, the reflected light beam traveling from the optical recording medium and converged by said objective passing through said polarized light separating surface of said beam splitter;
   detection means for detecting the converged light beam passed through said polarized light separating surface; and
   a total reflection surface provided between said polarized light separating surface and said detection means, said total reflection surface compensating for a phase difference created in the converged light beam when the converged light beam passes through said polarized light separating surface.

2. An apparatus according to claim 1, wherein the divergent light beam from said light source is a linearly-polarized light beam.

3. An apparatus according to claim 1, wherein said optical recording medium comprises an opto-magnetic recording medium.

4. An apparatus according to claim 1, wherein said total reflection surface comprises a back reflecting surface formed by a dielectric multilayer film integrally with said polarization beam splitter.

5. An apparatus according to claim 4, wherein a vitreous material forming said polarization beam splitter and said back reflecting surface has a refractive index of 1.7 or more at an operating wavelength.

6. An apparatus according to claim 1, wherein said objective has an object-side numerical aperture of 0.19 or less.

7. An optical information recording and reproducing apparatus comprising:
   a light source for producing a light beam for at least one of recording and reproducing information;
   a collimator lens for changing divergent light beam from said light source into a parallel light beam;
   an objective for converging the parallel light beam from said collimator lens on an optical recording medium and for changing a reflected light beam from said optical recording medium into a parallel light beam;
   a polarization beam splitter disposed between said light source and said collimator lens, said polarization beam splitter having a polarized light separating surface for reflecting the divergent light beam from said light source and leading the reflected light beam to said collimator lens, the reflected light beam traveling from the optical recording medium and converged by said collimator lens passing through said polarized light separating surface of said beam splitter;
   detection means for detecting the converged light beam passed through said polarized light separating surface; and
   a total reflection surface provided between said polarized light separating surface and said detection means, said total reflection surface compensating for a phase difference created in the converged light beam when the converged light beam passes through said polarized light separating surface.

8. An apparatus according to claim 7, wherein the divergent light beam from said light source is a linearly-polarized light beam.

9. An apparatus according to claim 7, wherein said optical recording medium comprises an opto-magnetic recording medium.

10. An apparatus according to claim 7, wherein said total reflection surface comprises a back reflecting surface formed by a dielectric multilayer film integrally with said polarization beam splitter.

11. An apparatus according to claim 10, wherein a vitreous material forming said polarization beam splitter and said back reflecting surface has a refractive index of 1.7 or more at an operating wavelength.

12. An apparatus according to claim 7, wherein said objective has an object-side numerical aperture of 0.19 or less.

13. An optical information recording and reproducing apparatus comprising:
   a light source for producing a light beam for at least one of recording and reproducing information;
   an objective for converging a divergent light beam from said light source on an optical recording medium and for converging a reflected light beam from said optical recording medium;
   a polarization beam splitter disposed between said light source and said objective, said polarization beam splitter having a polarized light separating surface for reflecting the divergent light beam from said light source and leading the reflected light beam to said objective, the reflected light beam traveling from the optical recording medium and converged by said objective passing through said polarized light separating surface of said beam splitter;

detection means for detecting the converged light beam passed through said polarized light separating surface; and a light shield plate disposed between said polarized light separating surface and said detection means, said light shield plate cutting off rays in opposite end portions of the converged light beam within a range of an effective beam diameter, which portions are greatly influenced by a phase difference created by passage through said polarization beam splitter.

14. An apparatus according to claim 13, wherein the divergent light beam from said light source is a linearly-polarized light beam.

15. An apparatus according to claim 13, wherein said optical recording medium comprises an opto-magnetic recording medium.

16. An apparatus according to claim 13, wherein said light shield plate cuts off opposite end portions of said converged light beam in the range of the effective light beam diameter corresponding to the direction of a plane of incidence on said polarization beam splitter.

17. An apparatus according to claim 13, wherein said light shield plate cuts off opposite end portions of said converged light beam in the range of the effective light beam diameter which contain a large amount of cross-talk components from tracks on said optical recording medium adjacent to a track presently tracked by the light beam.

18. An apparatus according to claim 13, wherein the end portion of the light beam cut off by said light shield plate includes a portion in a direction toward a track on said optical recording medium which is adjacent to a track presently tracked by the light beam.

19. An optical information recording and reproducing apparatus comprising:

a light source;

an objective for converging a divergent light beam from said light source on an optical recording medium and for converging a reflected light beam from said optical recording medium;

a polarization beam splitter disposed between said light source and said objective, said polarization beam splitter having a polarized light separating surface for reflecting the divergent light beam from said light source and leading the reflected light beam to said objective, the reflected light beam traveling from the optical recording medium and converged by said objective passing through said polarized light separating surface of said beam splitter;

detection means for detecting the converged light beam passed through said polarized light separating surface; and a total reflection surface provided between said polarized light separating surface and said detection means, said total reflection surface compensating for a phase difference created in the converged light beam when the converged light beam passes through said polarized light separating surface.

20. An apparatus according to claim 19, wherein said objective has an object-side numerical aperture of 0.19 or less.

21. An apparatus according to claim 19, wherein the divergent light beam from said light source is a linearly-polarized light beam.

22. An apparatus according to claim 19, wherein said optical recording medium comprises an opto-magnetic recording medium.

23. An apparatus according to claim 19, wherein said total reflection surface comprises a back reflecting surface formed by a dielectric multilayer film integrally with said polarization beam splitter.

24. An apparatus according to claim 23, wherein a vitreous material forming said polarization beam splitter and said back reflecting surface has a refractive index of 1.7 or more at an operating wavelength.

25. An optical information recording and reproducing apparatus comprising:

a light source;

a collimator lens for changing a divergent light beam from said light source into a parallel light beam;

an objective for converging the parallel light beam from said collimator lens on an optical recording medium and for changing a reflected light beam from said optical recording medium into a parallel light beam;

a polarization beam splitter disposed between said light source and said collimator lens, said polarization beam splitter having a polarized light separating surface for reflecting the divergent light beam from said light source and leading the reflected light beam to said collimator lens, the reflected light beam traveling from the optical recording medium and converged by said collimator lens passing through said polarized light separating surface of said beam splitter;

detection means for detecting the converged light beam passed through said polarized light separating surface; and a total reflection surface provided between said polarized light separating surface and said detection means, said total reflection surface compensation for a phase difference created in the converged light beam when the converged light beam passes through said polarized light separating surface.

26. An apparatus according to claim 25, wherein said objective has an object-side numerical aperture of 0.19 or less.

27. An apparatus according to claim 25, wherein the divergent light beam from said light source is a linearly-polarized light beam.

28. An apparatus according to claim 25, wherein said optical recording medium comprises an opto-magnetic recording medium.

29. An apparatus according to claim 25, wherein said total reflection surface comprises a back reflecting surface formed by a dielectric multilayer film integrally with said polarization beam splitter.

30. An apparatus according to claim 29, wherein a vitreous material forming said polarization beam splitter and said back reflecting surface has a refractive index of 1.7 or more at an operating wavelength.

31. An optical information recording and reproducing apparatus comprising:

a light source;

an objective for converging a divergent light beam from said light source on an optical recording medium and for converging a reflected light beam from said optical recording medium;

a polarization beam splitter disposed between said light source and said objective, said polarization beam splitter having a polarized light separating surface for reflecting the divergent light beam from said light source and leading the reflected light beam to said objective, the reflected light beam traveling from the optical recording medium and converged by said objective passing through said polarized light separating surface of said beam splitter;

detection means for detecting the converged light beam passed through said polarized light separating surface; and a light shield plate disposed between said polarized light separating surface and said detection means, said light shield plate cutting off rays in opposite end portions of the converged light beam within a range of an effective beam diameter, which portions are greatly influenced by a phase difference created by passage through said polarization beam splitter.

32. An apparatus according to claim 31, wherein said light shield plate cuts off opposite end portions of said converged light beam in the range of the effective light beam diameter which contain a large amount of cross-talk components from tracks on said optical recording medium adjacent to a track presently tracked by the light beam.

33. An apparatus according to claim 31, wherein the divergent light beam from said light source is a linearly-polarized light beam.

34. An apparatus according to claim 31, wherein said optical recording medium comprises an opto-magnetic recording medium.

35. An apparatus according to claim 31, wherein said light shield plate cuts off opposite end portions of said converged light beam in the range of the effective light beam diameter corresponding to the direction of a plane of incidence on said polarization beam splitter.

36. An apparatus according to claim 31, wherein the end portion of the light beam cut off by said light shield plate includes a portion in a direction toward a track on said optical recording medium which is adjacent to a track presently tracked by the light beam.

* * * * *

UNITED STATES PATENT AND TRADEMARK OFFICE
CERTIFICATE OF CORRECTION

PATENT NO. : 5,657,305
DATED : August 12, 1997
INVENTOR(S) : KENICHI SASAKI, et al.

It is certified that error appears in the above-indentified patent and that said Letters Patent is hereby corrected as shown below:

ON THE COVER PAGE, Page 2

Under "OTHER PUBLICATIONS":

"JP 60-252533, vol. 10, No." should read "JP 60-251533, vol. 10, No.--; and

"JP 62-164236, vol. 13," should read --JP 62-164236, vol. 12,--.

IN THE DRAWINGS

IN SHEET 8, FIGURE 8:

"POLALIZED" should read --POLARIZED--.

IN THE DISCLOSURE:

COLUMN 1

Line 50, "infinite." should read --infinite--.

COLUMN 3

Line 59, "bream." should read --beam.--.

UNITED STATES PATENT AND TRADEMARK OFFICE
CERTIFICATE OF CORRECTION

PATENT NO. : 5,657,305
DATED : August 12, 1997
INVENTOR(S) : KENICHI SASAKI, et al.

It is certified that error appears in the above-indentified patent and that said Letters Patent is hereby corrected as shown below:

COLUMN 4

Line 42, "to limit" should read --limits--.

COLUMN 6

Line 23, "noise proofing" should read --noise-proofing.--.

COLUMN 8

Line 55, "prevent" should read --prevents--.

COLUMN 11

Line 9, "45±6°." should read --45°±6°.--.

COLUMN 17

Line 54, "component" should read --components--.

COLUMN 18

Line 21, "such" should read --so--.

UNITED STATES PATENT AND TRADEMARK OFFICE
CERTIFICATE OF CORRECTION

PATENT NO. : 5,657,305  Page 3 of 3
DATED : August 12, 1997
INVENTOR(S) : KENICHI SASAKI, et al.

It is certified that error appears in the above-identified patent and that said Letters Patent is hereby corrected as shown below:

COLUMN 20

Line 14, "changing" should read --changing a--.

Signed and Sealed this

Fifth Day of May, 1998

Attest:

BRUCE LEHMAN

Attesting Officer          Commissioner of Patents and Trademarks